(12) United States Patent
Ohmi et al.

(10) Patent No.: US 10,322,691 B2
(45) Date of Patent: Jun. 18, 2019

(54) PASSENGER PROTECTING DEVICE

(71) Applicant: Toyota Jidosha Kabushiki Kaisha, Toyota-shi, Aichi-ken (JP)

(72) Inventors: Masanobu Ohmi, Kasugai (JP); Seiji Yamamoto, Seto (JP); Kosuke Sakakibara, Toyota (JP); Kazuki Sugie, Miyoshi (JP); Misato Kinoshita, Toyota (JP); Yoshiaki Matsumura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1 day.

(21) Appl. No.: 15/443,769

(22) Filed: Feb. 27, 2017

(65) Prior Publication Data

US 2017/0291564 A1  Oct. 12, 2017

(30) Foreign Application Priority Data

Apr. 8, 2016  (JP) .................................. 2016-078299

(51) Int. Cl.
*B60R 21/207* (2006.01)
*B60N 2/838* (2018.01)
(Continued)

(52) U.S. Cl.
CPC ............ *B60R 21/207* (2013.01); *B60N 2/838* (2018.02); *B60N 2/868* (2018.02); *B60R 21/231* (2013.01);
(Continued)

(58) Field of Classification Search
CPC .......... B60R 21/207; B60R 2021/0048; B60R 2021/2074; B60N 2/829; B60N 2/853; B60N 2/868
See application file for complete search history.

(56) References Cited

U.S. PATENT DOCUMENTS 4,637,655 A * 1/1987 Fourrey ................. B60N 2/829
                                                 297/410
4,720,146 A * 1/1988 Mawbey ................ B60N 2/914
                                                 297/409
(Continued)

FOREIGN PATENT DOCUMENTS

DE         19834061 A1    2/2000
JP         S47-013824 U  10/1972
(Continued)

OTHER PUBLICATIONS

Japanese Office Action dated Nov. 20, 2018, issued in Japanese Patent Application No. 2016-078299 and English Translation of Japanese Office Action, 6 pages.

*Primary Examiner* — Barry Gooden, Jr.
(74) *Attorney, Agent, or Firm* — Dinsmore & Shohl LLP

(57) ABSTRACT

A passenger protecting device including: an airbag device including an airbag that receives a supply of gas from an inflator and is inflated and expanded, by a front expanding portion that includes a front inflating portion to be inflated and expanded at a seat front side of the head portion and at least one of a chest portion and shoulder portions of the passenger, and a pair of left and right lateral expanding portions that include lateral inflating portions that are connected to the front expanding portion and are inflated and expanded at sides of the head portion of the passenger; and a position changing device that changes an inflated and expanded position of the airbag in a seat transverse direction, in accordance with a direction of collision of a collision body with respect to the vehicle seat.

4 Claims, 13 Drawing Sheets

(51) Int. Cl.
  *B60R 21/231* (2011.01)
  *B60R 21/235* (2006.01)
  *B60R 21/237* (2006.01)
  *B60N 2/868* (2018.01)
  *B60R 21/00* (2006.01)

(52) U.S. Cl.
  CPC .......... *B60R 21/235* (2013.01); *B60R 21/237* (2013.01); *B60R 21/23138* (2013.01); *B60R 2021/0048* (2013.01); *B60R 2021/2074* (2013.01); *B60R 2021/23146* (2013.01); *B60R 2021/23161* (2013.01); *B60R 2021/23192* (2013.01); *B60R 2021/23509* (2013.01); *B60R 2021/23547* (2013.01); *B60R 2021/23576* (2013.01)

(56) References Cited

U.S. PATENT DOCUMENTS

| | | | | | |
|---|---|---|---|---|---|
| 5,011,225 | A | * | 4/1991 | Nemoto | B60N 2/856 297/408 |
| 5,026,120 | A | * | 6/1991 | Takeda | B60N 2/853 297/408 |
| 5,052,754 | A | * | 10/1991 | Chinomi | B60N 2/829 297/408 |
| 5,823,619 | A | * | 10/1998 | Heilig | B60N 2/888 297/216.12 |
| 5,842,738 | A | * | 12/1998 | Knoll | B60R 21/207 297/216.12 |
| 6,196,579 | B1 | * | 3/2001 | Bowers | B60N 2/002 280/735 |
| 6,203,105 | B1 | * | 3/2001 | Rhodes, Jr. | A47C 4/54 297/284.6 |
| 6,402,238 | B1 | * | 6/2002 | Bigi | B60N 2/427 297/216.12 |
| 6,568,754 | B1 | * | 5/2003 | Norton | B60R 21/207 297/216.12 |
| 6,692,071 | B2 | * | 2/2004 | Fowler | B60N 2/4235 297/216.12 |
| 7,429,082 | B2 | * | 9/2008 | Kraft | B60N 2/859 297/408 |
| 7,478,828 | B2 | * | 1/2009 | Heuschmid | B60R 21/207 180/274 |
| 7,640,090 | B2 | * | 12/2009 | Uchida | B60N 2/002 701/49 |
| 9,156,426 | B1 | * | 10/2015 | Faruque | B60R 21/207 |
| 9,333,887 | B2 | * | 5/2016 | Talamonti | B60N 2/874 |
| 9,527,409 | B2 | * | 12/2016 | Uebelacker | B60N 2/2222 |
| 9,610,864 | B2 | * | 4/2017 | Uebelacker | B60N 2/2222 |
| 9,919,673 | B2 | * | 3/2018 | Ohno | B60R 21/207 |
| 10,189,431 | B2 | * | 1/2019 | Yamamoto | B60R 21/207 |
| 2003/0015898 | A1 | * | 1/2003 | Breed | B60N 2/002 297/216.12 |
| 2003/0151279 | A1 | * | 8/2003 | Fowler | B60N 2/4235 297/216.12 |
| 2004/0075252 | A1 | * | 4/2004 | Pan | B60R 21/207 280/730.1 |
| 2006/0186713 | A1 | * | 8/2006 | Breed | B60N 2/0232 297/216.12 |
| 2007/0096516 | A1 | * | 5/2007 | Heeg | B60N 2/888 297/216.12 |
| 2007/0251749 | A1 | * | 11/2007 | Breed | B60J 10/00 180/273 |
| 2008/0042477 | A1 | * | 2/2008 | Breed | B60N 2/0232 297/216.12 |
| 2008/0223215 | A1 | | 9/2008 | Iijima et al. | |
| 2008/0228359 | A1 | * | 9/2008 | Uchida | B60N 2/002 701/49 |
| 2009/0265063 | A1 | | 10/2009 | Kasugai et al. | |
| 2012/0049493 | A1 | * | 3/2012 | Lee | B60R 21/207 280/730.2 |
| 2014/0015233 | A1 | * | 1/2014 | Fukawatase | B60R 21/207 280/730.1 |
| 2014/0062069 | A1 | * | 3/2014 | Fukawatase | B60R 21/23138 280/730.2 |
| 2014/0327234 | A1 | * | 11/2014 | Heurlin | B60R 21/207 280/730.1 |
| 2016/0121839 | A1 | * | 5/2016 | Ko | B60R 21/233 280/730.1 |
| 2017/0203711 | A1 | * | 7/2017 | Ohno | B60R 21/203 |
| 2017/0282834 | A1 | * | 10/2017 | Sugie | B60R 21/01512 |
| 2017/0282933 | A1 | * | 10/2017 | Ohmi | B60R 21/23138 |
| 2017/0291565 | A1 | * | 10/2017 | Yamamoto | B60R 21/207 |
| 2017/0291569 | A1 | * | 10/2017 | Sugie | B60R 21/233 |
| 2017/0297524 | A1 | * | 10/2017 | Sugie | B60R 21/01554 |
| 2017/0334385 | A1 | * | 11/2017 | Sakakibara | B60R 21/207 |
| 2018/0029510 | A1 | * | 2/2018 | Little | B60N 2/4829 |
| 2018/0154810 | A1 | * | 6/2018 | Flynn | B60N 2/838 |
| 2019/0031132 | A1 | * | 1/2019 | Dry | B60R 21/207 |

FOREIGN PATENT DOCUMENTS

| | | |
|---|---|---|
| JP | S60180639 U | 11/1985 |
| JP | 2000-344044 A | 12/2000 |
| JP | 2007230396 A | 9/2007 |
| JP | 2008081088 A | 4/2008 |
| JP | 2008-222166 A | 9/2008 |
| JP | 2008221166 A | 9/2008 |
| JP | 2011-098726 A | 5/2011 |
| JP | 2013018378 A | 1/2013 |
| JP | 2016-043860 A | 4/2016 |
| WO | 2016/174785 A1 | 11/2016 |

* cited by examiner

PASSENGER PROTECTING DEVICE

CROSS-REFERENCE TO RELATED APPLICATION

This application is based on and claims priority under 35 USC 119 from Japanese Patent Application No. 2016-078299 filed on Apr. 8, 2016, the disclosure of which is incorporated by reference herein.

BACKGROUND

Technical Field

The present disclosure relates to a passenger protecting device.

Related Art

In the airbag device disclosed in Japanese Patent Application Laid-Open (JP-A) No. 2000-344044, at the time of a collision, an airbag is inflated so as to surround the front and the sides of the head portion of a passenger. Concretely, a gas supplying pipe is fixed to a seatback, and the airbag is mounted to the gas supplying pipe. Gas of an inflator is supplied through the gas supplying pipe to the airbag, and the airbag is inflated.

However, in the above-described airbag, there is room for improvement with regard to the point of restraining the head portion of the passenger at an early stage by the airbag. Namely, in a vehicle collision, the head portion of a passenger is displaced by inertial force. For example, when the form of the vehicle collision is an oblique collision or a side collision or the like, the head portion of the passenger is displaced in the seat transverse direction by inertial force. Therefore, for example, if the build of the airbag in the seat transverse direction is set in accordance with the amount of displacement of the head portion in the seat transverse direction at the time of a side collision, in an oblique collision or the like in which the amount of displacement of the head portion in the seat transverse direction is small as compared with in a side collision, the time until the head portion of the passenger hits the both side portions of the airbag is long as compared with in a side collision.

Due thereto, there is the possibility that the head portion of the passenger will not be able to be restrained by the airbag at an early stage.

SUMMARY

In view of the above-described circumstances, the present disclosure provides a passenger protecting device that can restrain the head portion of a passenger by an airbag at an early stage, not only in the case of a side collision, but also in the case of an oblique collision.

A passenger protecting device of a first aspect of the present disclosure includes: an airbag device that has an airbag that, from a state of being accommodated in a headrest of a vehicle seat, receives a supply of gas from an inflator and is inflated and expanded, and the airbag is structured as an integral bag body that surrounds a head portion of a passenger, by a front expanding portion, that includes a front inflating portion that is inflated and expanded at a seat front side of the head portion and at least one of a chest portion and shoulder portions of the passenger, and a pair of left and right lateral expanding portions that include lateral inflating portions that are connected to the front expanding portion and that are inflated and expanded at sides of the head portion of the passenger; and a position changing device that, by operating, changes an inflated and expanded position of the airbag in a seat transverse direction in accordance with a direction of collision of a collision body with respect to the vehicle seat.

In the passenger protecting device of the first aspect of the present disclosure, the airbag of the airbag device is accommodated in the headrest of the vehicle seat. When gas is supplied from the inflator to the airbag, the airbag is inflated and expanded from the headrest. Further, the airbag is structured, by the front expanding portion and the pair of left and right lateral expanding portions, as an integral bag body that surrounds the head portion of the passenger. Concretely, the front expanding portion has a front inflating portion that is inflated and expanded in front of the head portion and at least one of the chest portion and the shoulder portions of the passenger. Further, the lateral expanding portions have lateral inflating portions that are inflated and expanded at the sides of the head portion of the passenger. The lateral inflating portions are connected to the front expanding portion. Due thereto, at the time of a collision of the vehicle, the head portion of the passenger can be protected from the seat front side and from the sides.

Here, the passenger protecting device has the position changing device. Due to the position changing device operating, the inflated and expanded position of the airbag in the seat transverse direction is changed in accordance with the direction of the collision of a collision body with respect to the vehicle seat. Therefore, for example, at the time of an oblique collision or a side collision, the inflated and expanded position of the airbag can be shifted in the seat transverse direction in accordance with the amount of displacement of the head portion of the passenger in the seat transverse direction. Due thereto, the airbag can be applied to the head portion of the passenger while an increase in the size of the airbag in the seat transverse direction is suppressed. Accordingly, the head portion of the passenger can be restrained by the airbag at an early stage, not only in the case of a side collision, but also in the case of an oblique collision.

In a passenger protecting device of a second aspect of the present disclosure, in the passenger protecting device of the first aspect, the vehicle seat is structured so as to be able to rotate with a seat vertical direction being an axial direction.

In the passenger protecting device of the second aspect of the present disclosure, the vehicle seat is structured so as to be able to rotate with the seat vertical direction being the axial direction. Therefore, the inflated and expanded position of the airbag in the seat transverse direction can be changed in accordance with the direction of a collision of a collision body with respect to a rotating-type vehicle seat. Thus, for example, even in a a vehicle that can be driven automatically and in which a rotating-type vehicle seat is installed, the head portion of the passenger can be restrained by the airbag at an early stage.

In a passenger protecting device of a third aspect of the present disclosure, in the passenger protecting device of the first or second aspect, the headrest is connected to a seatback via a headrest stay, and the headrest stay is supported at the seatback so as to be able to rotate with a seat longitudinal direction being an axial direction, and the position changing device has a tilting mechanism portion that tilts the headrest in the seat transverse direction.

In the passenger protecting device of the third aspect of the present disclosure, the headrest stay is rotatably supported at the seatback with the seat longitudinal direction being the axial direction. The headrest is connected to the seatback via the headrest stay. Therefore, the headrest is structured so as to be able to rotate relative to the seatback. Further, the position changing device has the tilting mechanism portion, and the headrest is tilted in the seat transverse direction by the tilting mechanism portion. Therefore, the inflated and expanded position of the airbag can be shifted in the seat transverse direction by utilizing the headrest that accommodates the airbag.

In a passenger protecting device of a fourth aspect of the present disclosure, in the passenger protecting device of the third aspect, the tilting mechanism portion is structured to include a moving member that is connected to a lower portion of the headrest stay and that is structured so as to be able to move in the seat transverse direction, and a driving member that, by driving, moves the moving member in the seat transverse direction.

In the passenger protecting device of the fourth aspect of the present disclosure, the moving member of the tilting mechanism portion is connected to the lower portion of the headrest stay, and the moving member is moved in the seat transverse direction by driving of the driving member. Therefore, the headrest stay is rotated relative to the seatback, and the headrest is rotated relative to the seatback. Due thereto, there can be a structure in which the headrest is tilted in the seat transverse direction by a simple structure.

In a passenger protecting device of a fifth aspect of the present disclosure, in the passenger protecting device of the first or second aspect, the airbag is accommodated in an airbag case, the airbag case has a pair of left and right side walls that guide inflation and expansion of the airbag, and the position changing device has a tilting mechanism portion that tilts the side walls in the seat transverse direction.

In the passenger protecting device of the fifth aspect of the present disclosure, the airbag case that accommodates the airbag has the pair of left and right side walls, and there is a structure in which the inflation and expansion of the airbag is guided by the pair of left and right side walls. Further, the pair of left and right side walls are tilted in the seat transverse direction by the tilting mechanism portion. Therefore, the inflated and expanded position of the airbag can be shifted in the seat transverse direction by utilizing the airbag case that accommodates the airbag.

In a passenger protecting device of a sixth aspect of the present disclosure, in the passenger protecting device of the fifth aspect, the airbag case has a base portion that rotatably supports lower end portions of the side walls with a seat longitudinal direction being an axial direction, and the tilting mechanism portion is structured to include a moving member that is connected to upper portions of the side walls and is structured so as to be able to move in the seat transverse direction, and a driving member that, by driving, moves the moving member in the seat transverse direction.

In the passenger protecting device of the sixth aspect of the present disclosure, the airbag case has a base portion. The lower end portions of the pair of left and right side walls are rotatably supported at the base portion with the seat longitudinal direction being the axial direction. Further, the upper portions of the side walls are connected to the moving member of the tilting mechanism portion, and the moving member is moved in the seat transverse direction due to the driving member driving. Due thereto, there can be a structure in which the pair of left and right side walls are tilted in the seat transverse direction by a simple structure.

In a passenger protecting device of a seventh aspect of the present disclosure, in the passenger protecting device of the first or second aspect, an opening portion through which the airbag passes at a time when the airbag inflates and expands is formed in an upper end portion of the headrest, and the position changing device is structured to include a cover portion that closes the opening portion, and that opens at the time when the airbag inflates and expands, and an adjusting member that adjusts an opening angle of the cover portion, and that, by the cover portion, changes a position of the airbag after inflation and expansion.

In the passenger protecting device of the seventh aspect of the present disclosure, the opening angle of the cover portion is adjusted by the adjusting member of the position changing device, and the position of the airbag, after inflation and expansion, is changed by the cover portion. Namely, the position of the airbag can be changed by adjusting the opening angle of the cover portion that is provided at the headrest. Due thereto, the position of the airbag, after inflation and expansion, in the seat transverse direction can be changed by a simple structure.

As described above, in accordance with the passenger protecting device of the present disclosure, the head portion of a passenger can be restrained by an airbag at an early stage, not only in the case of a side collision, but also in the case of an oblique collision.

BRIEF DESCRIPTION OF THE DRAWINGS

Exemplary embodiments of the present disclosure will be described in detail based on the following figures, wherein.

DETAILED DESCRIPTION

First Embodiment

Figure 1:
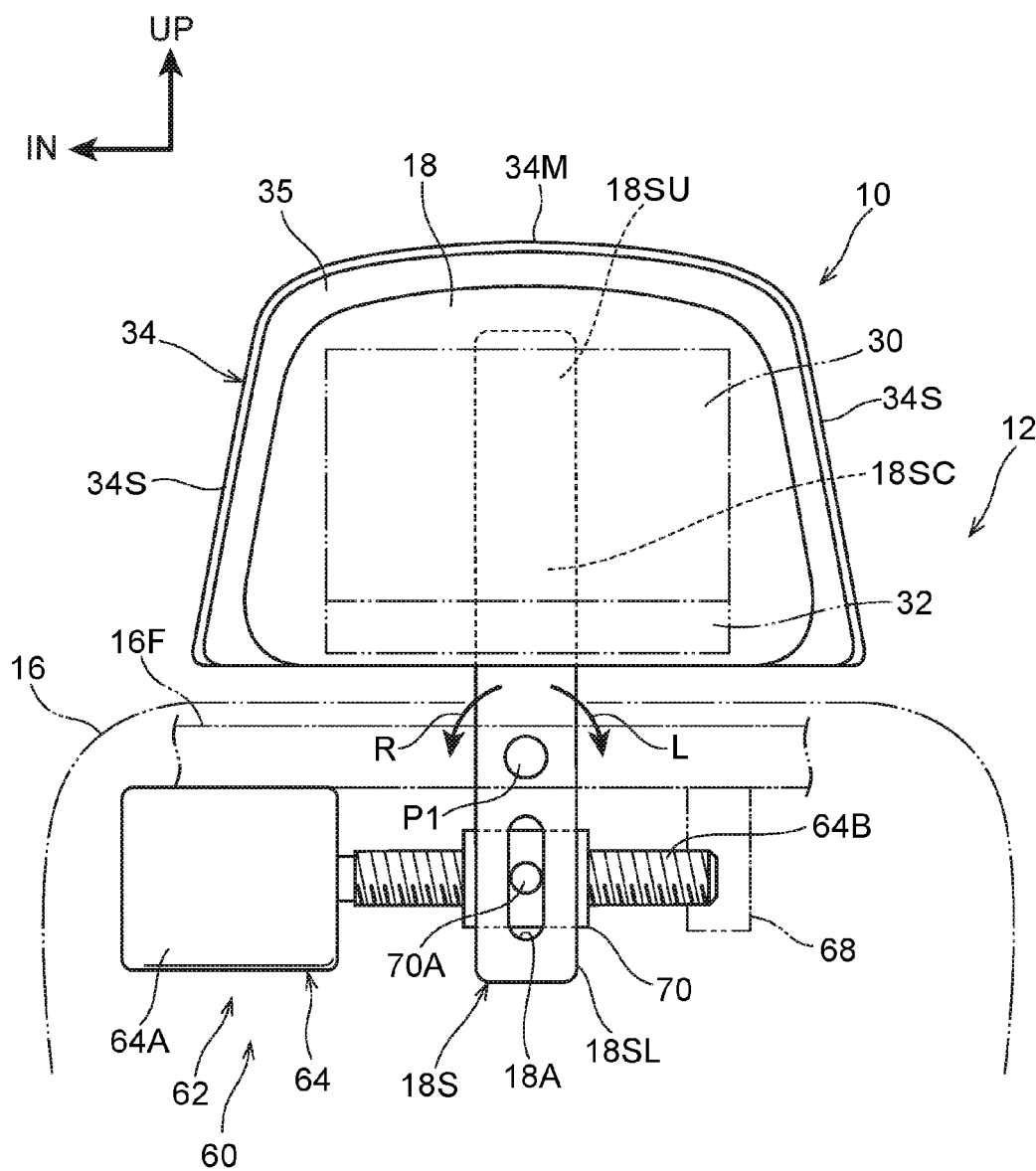
FIG. 1 is a front view that schematically shows a position changing device that is used in a passenger protecting device relating to a first embodiment.

A passenger protecting device 10 relating to a first embodiment is described hereinafter by using FIG. 1 through FIG. 10. As shown in FIG. 2, the passenger protecting device 10 is structured to include a multidirectional airbag device 28 that serves as an "airbag device" and that is installed in a vehicle seat 12 of a vehicle (an automobile), and an ECU 80 (see FIG. 8) that serves as a "control section". Further, the passenger protecting device 10 has a position changing device 60 (see FIG. 1) that changes the inflated and expanded position of a multidirectional airbag 30 that serves as an "airbag", at the time when the multidirectional airbag device 28 operates. Hereinafter, the vehicle seat 12 in which the multidirectional airbag device 28 is installed will be described first, and then, the multidirectional airbag device 28, the position changing device 60 and the ECU 80 will be described. Note that arrow FR and arrow UP that are shown appropriately in the drawings indicate the forward direction (the direction in which a seated passenger faces) and the upward direction of the vehicle seat 12, respectively. Hereinafter, when merely longitudinal, vertical and left-right directions are used, they refer to the longitudinal of the seat longitudinal direction, the vertical of the seat vertical direction, and the left and right when facing forward in the seat longitudinal direction, unless otherwise indicated. Note that arrow IN that is marked appropriately in the respective drawings indicates the vehicle central side in the vehicle transverse direction at the vehicle.

Figure 2:
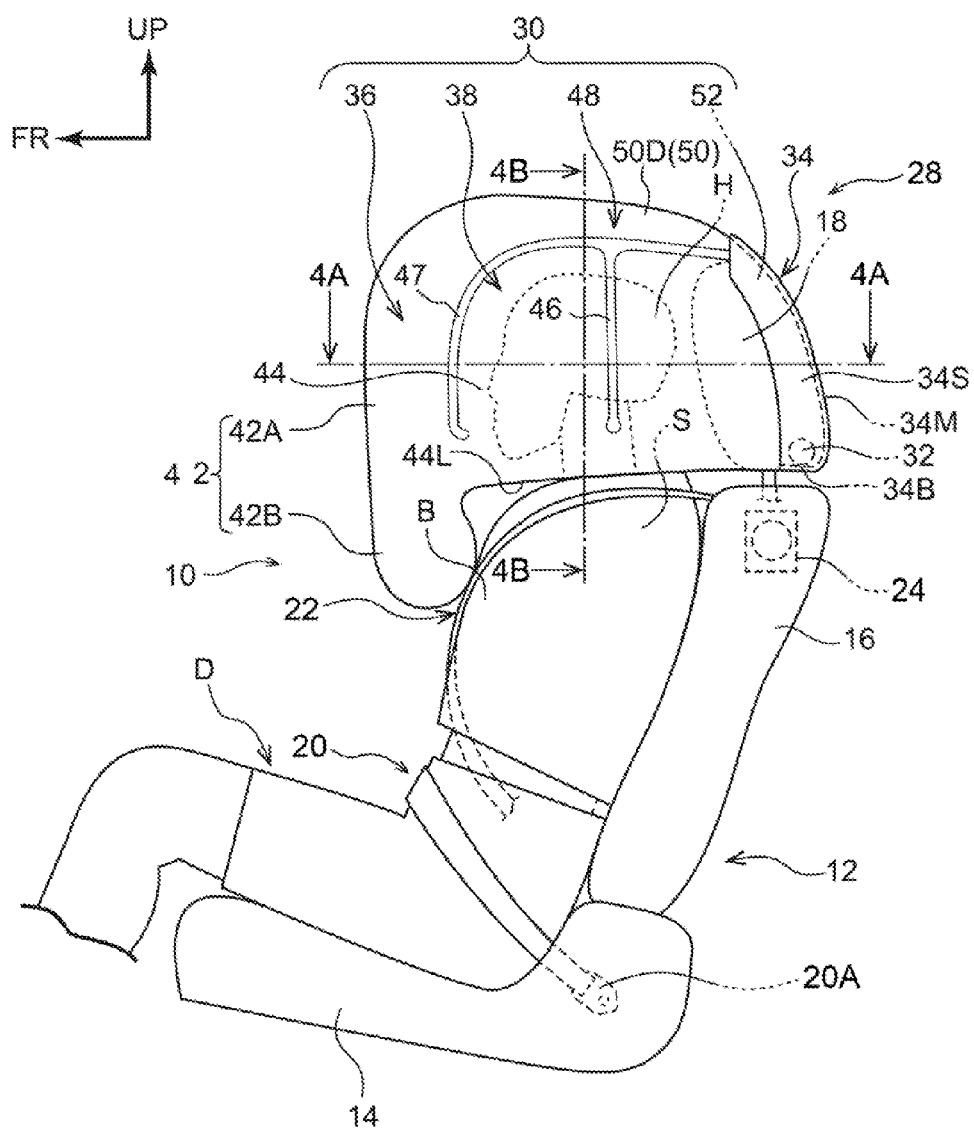
FIG. 2 is a side view schematically showing a mode of protecting a seated person by a multidirectional airbag device shown in FIG. 1.
Figure 3:
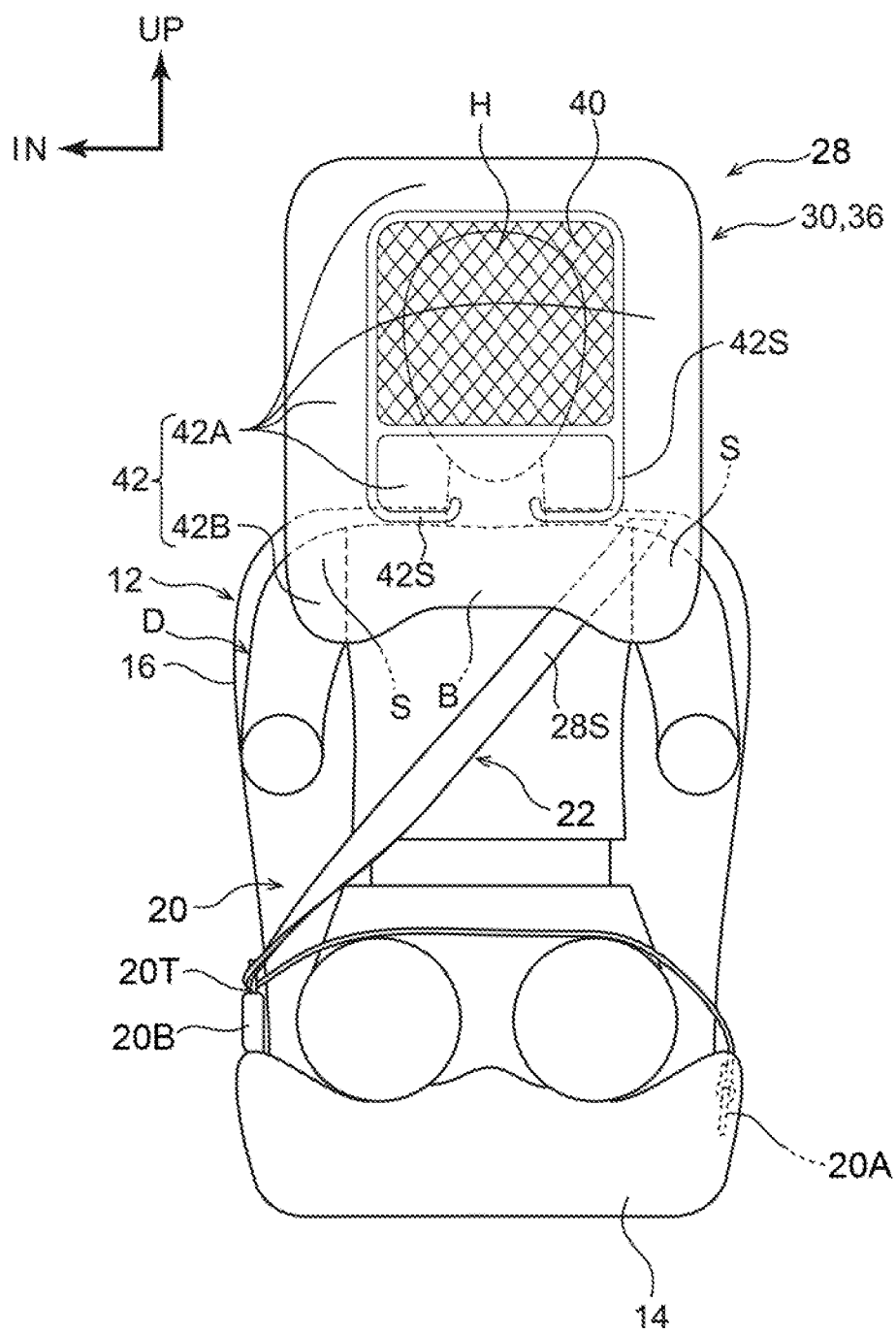
FIG. 3 is a front view schematically showing the mode of protecting the seated person by the multidirectional airbag device shown in FIG. 2.

As shown in FIG. 2 and FIG. 3, the vehicle seat 12 is disposed so as to be offset to either one of the left or the right (toward the left side in the present embodiment) with respect to the vehicle transverse direction center of a vehicle body (not illustrated) of the vehicle. Further, in the present embodiment, the vehicle seat 12 is disposed in a state in which the seat longitudinal direction coincides with the vehicle longitudinal direction of the vehicle, and the seat transverse direction coincides with the vehicle transverse direction of the vehicle.

The vehicle seat 12 is structured to include a seat cushion 14 that supports the buttocks of the seated passenger, and a seatback 16 that supports the back portion of the seated passenger. The lower end of the seatback 16 is connected to the rear end of the seat cushion 14. Further, the vehicle seat 12 has a headrest 18 that supports the head portion of the seated passenger. The headrest 18 is disposed at the upper side of the seatback 16.

Figure 6:
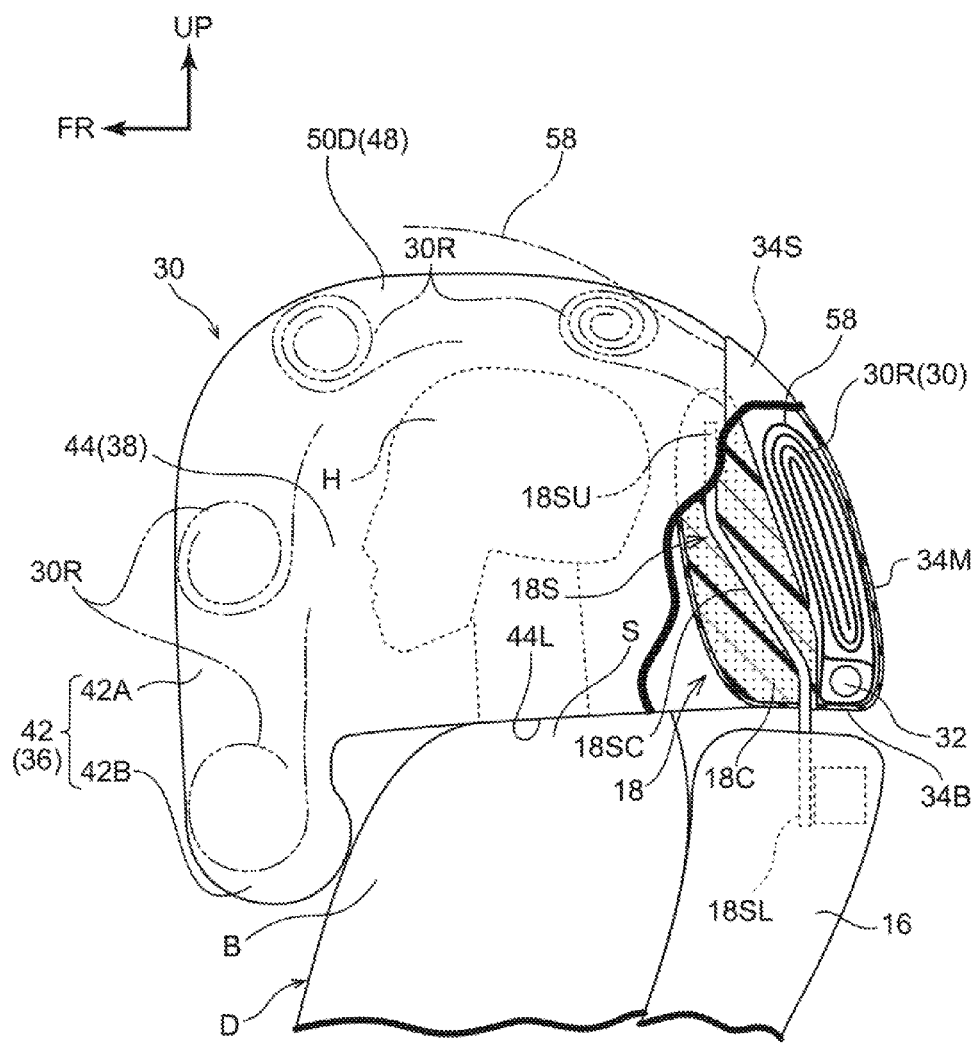
FIG. 6 is a schematic enlarged side view, of which a portion is cut-away, for explaining the process of inflation and expansion of the multidirectional airbag that structures the multidirectional airbag device shown in FIG. 2.

As shown in FIG. 1, the headrest 18 is mounted to the seatback 16 via a headrest stay 18S. The headrest stay 18S is formed in the shape of a plate whose plate thickness direction is substantially the vehicle longitudinal direction, and extends in the vertical direction, and is disposed at the position of the vehicle transverse direction substantial center of the headrest 18. Further, a lower portion 18SL of the headrest stay 18S is disposed within the upper portion of the seatback 16, and is rotatably connected by a connecting pin P1, whose axial direction is the longitudinal direction, to a seatback frame 16F that structures the frame of the seatback 16. Due thereto, the headrest 18 is structured so as to be able to rotate around the connecting pin P1. Further, as shown in FIG. 6, an upper portion 18SU of the headrest stay 18S is disposed within the headrest 18, and is positioned at the front side with respect to the lower portion 18SL. The lower portion 18SL and the upper portion 18SU are connected by an intermediate portion 18SC that is tilted.

As shown in FIG. 1, a connecting groove 18A that extends in the length direction of the headrest stay 18S is formed in the lower portion 18SL of the headrest stay 18S at a position that is at the lower side with respect to the connecting pin P1. Further, at the connecting groove 18A, the headrest stay 18S is connected to the position changing device 60 that is described later. Due thereto, rotation of the headrest stay 18S is limited by the position changing device 60. Note that the headrest 18 is disposed so as to be apart from the seatback 16 at the upper side thereof, and a predetermined gap is formed between the headrest 18 and the seatback 16. This gap is set such that the lower end of the headrest 18 does not interfere with the upper end of the seatback 16 at the time when the headrest 18 tilts in the seat transverse direction due to the position changing device 60 that is described later.

Further, FIG. 2, FIG. 3, FIG. 5A, FIG. 5B and the like illustrate a state in which a crash test dummy (mannequin) D is seated on the seat cushion 14 of the vehicle seat 12 as a model of a passenger who is to be protected. The dummy D is, for example, an AM50 (50th percentile U.S. adult male) World SID (internationally standardized side crash dummy: World Side Impact Dummy). This dummy D is seated in a standard seated posture that is prescribed by crash test methods, and the vehicle seat 12 is positioned at a standard set position that corresponds to this seated posture. Hereinafter, in order to make the explanation easy to understand, the dummy is called "seated person D".

Further, as shown in FIG. 2 and FIG. 3 and the like, the vehicle seat 12 is provided with a seatbelt device 20 that is structured as a three-point seatbelt device. Concretely, one end of a belt (a webbing) 22 of the seatbelt device 20 is connected to the spool of a retractor 24, and the belt 22 is taken-up onto the spool so as to be able to be pulled-out therefrom. On the other hand, the other end of the belt 22 is fixed to an anchor 20A. Further, a tongue plate 20T is provided at the belt 22 so as to be slidable. The belt 22 is applied to the seated person D due to the tongue plate 20T being anchored with a buckle 20B.

(Structure of Multidirectional Airbag Device)

As shown in FIG. 2, the multidirectional airbag device 28 is structured to include the multidirectional airbag 30 that serves as an "airbag", an inflator 32, and a module case 34 that serves as an "airbag case". The multidirectional airbag 30 is accommodated in a folded-up state within the module case 34, and the multidirectional airbag device 28 is made into a module. The multidirectional airbag device 28 that is a module is provided at the headrest 18 (see FIG. 5A). Concrete description thereof is given hereinafter.

<Multidirectional Airbag>

Figure 4A:
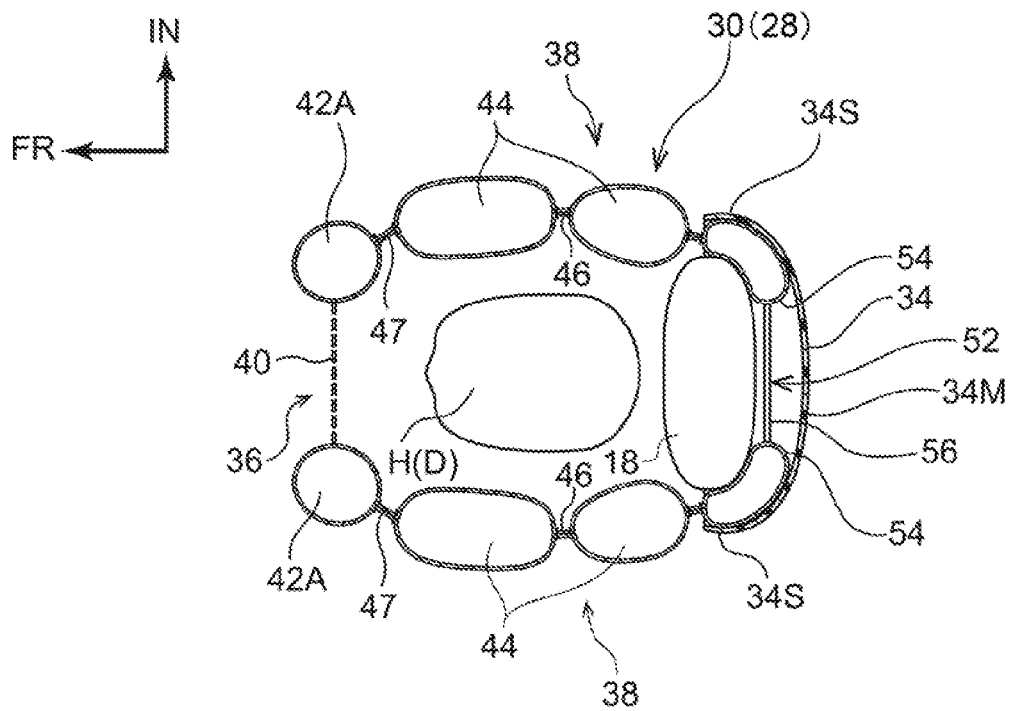
FIG. 4A is a drawing showing an inflated and expanded state of a multidirectional airbag that structures the multidirectional airbag device shown in FIG. 2, and is a cross-sectional view along line 4A-4A of FIG. 2.

As shown in FIG. 4A, the multidirectional airbag 30 is structured as an integral bag body that is inflated and expanded so as to surround a head portion H of the seated person D (hereinafter simply called the "head portion H" upon occasion) from the front side and the left and right both sides as seen in a planar sectional view. Concretely, as shown in FIG. 2 through FIG. 4A and FIG. 4B, the multidirectional airbag 30 is structured to have a front expanding portion 36 that is expanded at the front side of the head portion H, and a pair of left and right lateral expanding portions 38 that are expanded at the left and right both sides of the head portion H.

The front expanding portion 36 is structured to include a mesh portion 40 that is expanded at the front side of the head portion H, and a front inflating portion 42 that is inflated and expanded so as to surround the mesh portion 40 as seen in a front view. The mesh portion 40 is formed in a substantially rectangular shape as seen in a front view, and is made to be a see-through structure. The front inflating portion 42 is rectangular frame-shaped, and the inner peripheral edge of the front inflating portion 42 is joined to the mesh portion 40. The front inflating portion 42 receives a supply of gas and is inflated and expanded.

As shown in FIG. 3, of the front inflating portion 42, the portions that surround the mesh portion 40 mainly above the seatback 16 are first inflating portions 42A, and the first inflating portions 42A are inflated and expanded in front of the head portion H. On the other hand, of the front inflating portion 42, the portion that is positioned below the first inflating portions 42A (the portion that overlaps the seatback 16) is a second inflating portion 42B. The second inflating portion 42B is inflated and expanded in front of a chest portion B, shoulder portions S and the head portion H of the seated person D. Due thereto, there is a structure in which the upper part of the body of the seated person D is restrained by the second inflating portion 42B. Further, gas is supplied to the second inflating portion 42B through the first inflating portions 42A. Note that, in the present embodiment, the portions of the first inflating portions 42A, which portions are positioned below the mesh portion 40, are sectioned-off by seams 42S from the other portions at the first inflating portions 42A, and gas is supplied thereto through the second inflating portion 42B.

Figure 4B:
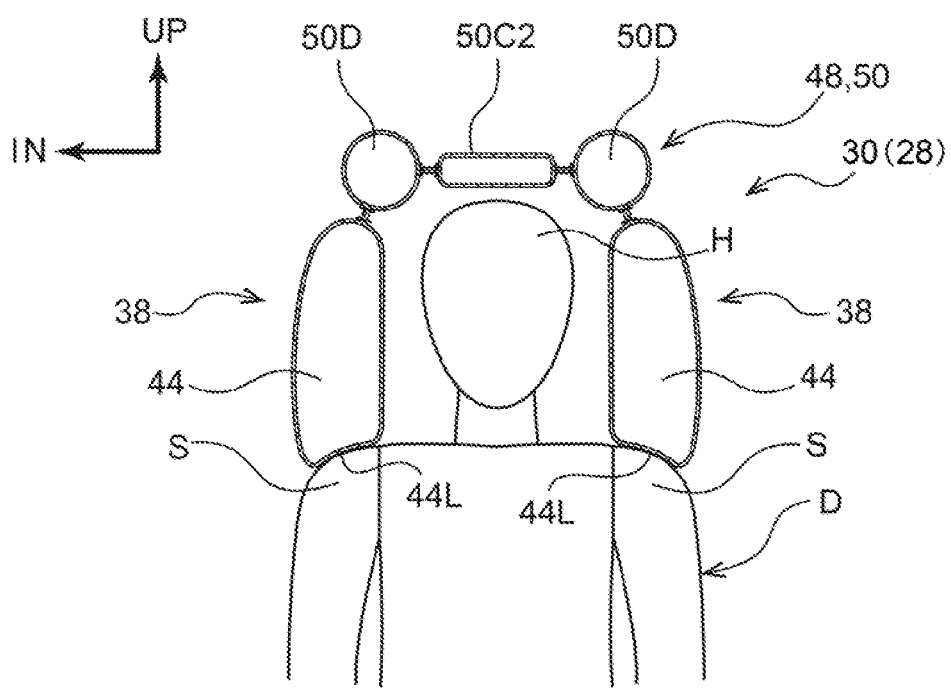
FIG. 4B is a drawing showing an inflated and expanded state of the multidirectional airbag that structures the multidirectional airbag device shown in FIG. 2, and is a cross-sectional view along line 4B-4B of FIG. 2.

As shown in FIG. 2 and FIGS. 4A and 4B, the lateral expanding portions 38 have lateral inflating portions 44 that receive a supply of gas and are inflated and expanded at the left and right both sides of the head portion H. The size of the lateral inflating portions 44 is set to be a size (a surface area) that overlaps the entire head portion H as seen in a side view. Further, seam portions 46 that extend along the vertical direction are formed at the longitudinal direction intermediate portions of the lateral inflating portions 44, and the lateral inflating portions 44 are sectioned forward and rearward by the seam portions 46. In further detail, the seam portions 46 demarcate the lateral inflating portions 44 into front and rear portions at the portions of the lateral inflating portions 44 that overlap the head portion H.

At the left and right lateral inflating portions 44, the respective front ends thereof are connected, in communicating states, to the lower ends of the first inflating portions 42A that correspond to the left and right at the front inflating portion 42 (are connected in vicinities of the border of the first inflating portions 42A and the second inflating portion 42B). Due thereto, gas is supplied to the left and right lateral inflating portions 44 via the front inflating portion 42. On the other hand, seam portions 47 are provided between the first inflating portions 42A of the front inflating portion 42 and the lateral inflating portions 44. The first inflating portions 42A and the lateral inflating portions 44 are partitioned by the seam portions 47 at the upper side of the aforementioned communicating portions.

Further, at the left and right lateral expanding portions 38, lower ends 44L of the respective lateral inflating portions 44 contact upper portions of the shoulder portions S of the seated person D in the state in which the multidirectional airbag 30 is inflated and expanded. Due thereto, there is a structure in which the position, in the vertical direction, of the multidirectional airbag 30 in the inflated and expanded state with respect to (the head portion H of) the seated person D is determined. Note that there is a structure in which, at the multidirectional airbag 30, in this positioned state thereof, all of the front expanding portion 36, the left and right lateral expanding portions 38 and an upper expanding portion 48 that is described later do not contact (a gap is formed between) the head portion H of the seated person D who is in a usual seated posture.

Moreover, as shown in FIG. 2, the multidirectional airbag 30 has the upper expanding portion 48 that is expanded at the upper side of the head portion H of the seated person D. The upper expanding portion 48 is connected to the respective upper edges of the front expanding portion 36 and the left and right lateral expanding portions 38. This upper expanding portion 48 is structured with the main portion thereof being an upper inflating portion 50 that receives a supply of gas and is inflated and expanded. The upper inflating portion 50 is structured to include a central inflating portion 50C (see FIG. 7) that is inflated and expanded above the head portion H, and a pair of upper duct portions 50D that extend along the longitudinal direction at the left and right of the central inflating portion 50C.

Figure 7:
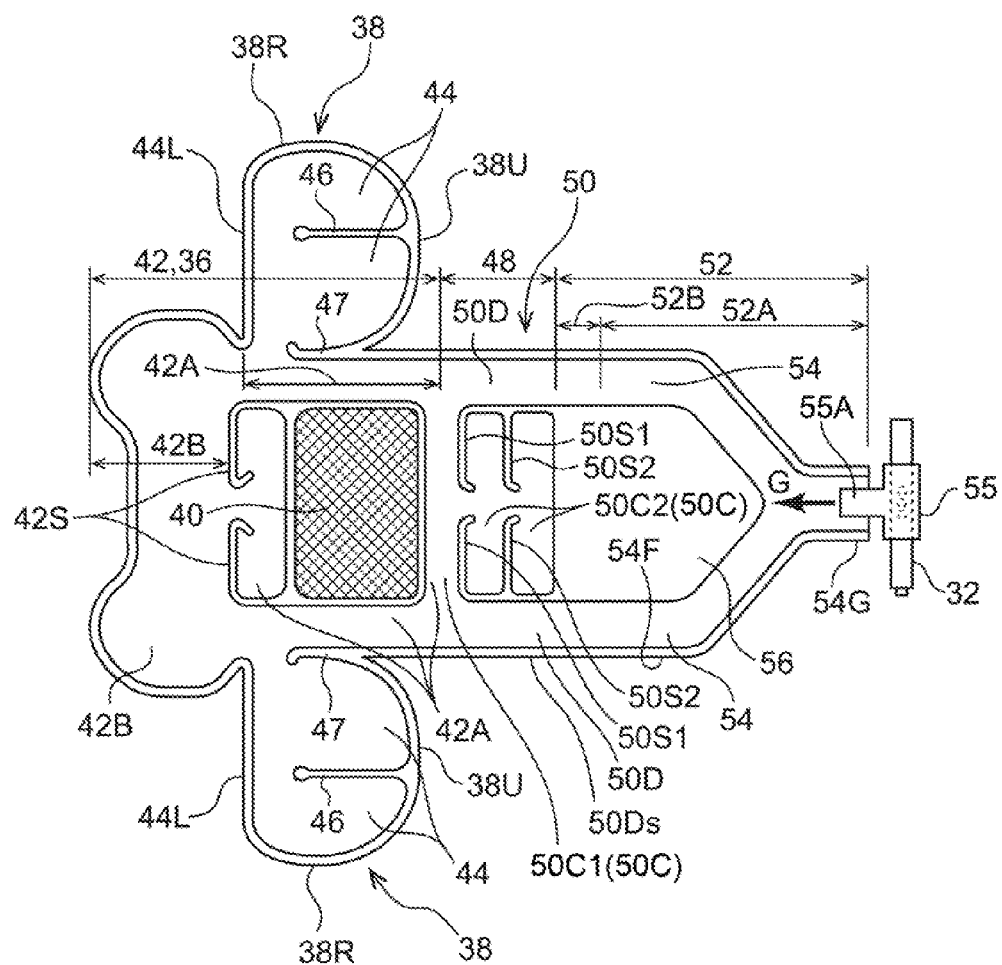
FIG. 7 is a drawing showing the flat pattern of the multidirectional airbag that structures the multidirectional airbag device shown in FIG. 2.

As shown in FIG. 7, the central inflating portion 50C includes an inflating portion 50C1 that is shared with the portion that forms the upper edge of the front inflating portion 42, and inflating portions 50C2 that are sectioned-off from the inflating portion 50C1 by seam portions 50S1 such that gas can flow therein. The left and right both ends of the inflating portion 50C1 communicate with the upper duct portions 50D, and the seat transverse direction central portion of the rear edge of the inflating portion 50C1 communicates with the inflating portions 50C2. The inflating portions 50C2 are sectioned into portions at the front and the rear by seam portions 50S2 such that gas can flow therein. The front ends of the left and right upper duct portions 50D communicate with the left and right both side edges of the upper end of the front inflating portion 42.

The multidirectional airbag 30 has a rear expanding portion 52 that is expanded at the rear of the upper expanding portion 48. The rear expanding portion 52 is structured to include rear duct portions 54 that are inflating portions, and a non-inflating portion 56. The rear duct portions 54 are divided to the left and the right, and the respective upper ends thereof are connected, in communicating states, to the upper duct portions 50D that correspond to the left and the right. The left and right rear duct portions 54 are connected to one another at the non-inflating portion 56 whose front edge is joined to the rear edge of the central inflating portion 50C.

Further, the left and right rear duct portions 54 merge with one another beneath the non-inflating portion 56 that forms a pentagonal shape in the flat pattern of FIG. 7, and form a gas introducing portion 54G. The gas introducing portion 54G is connected such that gas from the inflator 32 can be supplied thereto via a diffuser 55 that is T-shaped (refer to arrow G). Namely, a gas jet-out end 55A of the diffuser 55 is inserted, in an airtight state, into the gas introducing portion 54G. Note that the present embodiment is not limited to a structure that utilizes the diffuser 55. For example, a portion, that includes a gas jet-out port, of the inflator 32 that is disposed vertically may be inserted in the gas introducing portion 54G. Or, for example, the gas introducing portion 54G may be structured so as to be bent into an L-shape, and a portion, that includes a gas jet-out port, of the inflator 32 that is disposed horizontally may be inserted in the gas introducing portion 54G.

The rear inflating portion 52 that is described above can be divided into a base portion 52A that is expanded at the rear of the headrest 18, and a connecting portion 52B that is expanded above the headrest 18. The base portion 52A is, at the lower end thereof, supported at the seatback 16 via the inflator 32. The connecting portion 52B connects the base portion 52A and the upper expanding portion in a communicating state.

The multidirectional airbag 30, before being folded-up, is in the expanded state (the flat pattern) shown in FIG. 7. The multidirectional airbag 30 in its expanded form is formed as an integral bag body by OPW (the abbreviation for One Piece Weaving). Note that the multidirectional airbag 30 may be formed as an integral bag body by a method (cutting and sewing) of sewing together the peripheral edges of two fabrics.

At the multidirectional airbag 30, from the state shown in FIG. 7, upper edges 38U of the lateral expanding portions 38 are joined by sewing or the like to side edge 50Ds of the upper duct portions 50D, and rear edges 38R of the lateral expanding portions 38 are joined by sewing or the like to front edges 54F of the rear duct portions 54. The multidirectional airbag 30 is, from this joined state, folded-up and accommodated in the module case 34. The folded-up form of the multidirectional airbag 30 will be described later together with the structure of an expansion guiding cloth 58 and the structure of the module case 34.

<Inflator>

As shown in FIG. 6, a combustion type inflator or a cold gas type inflator is employed as the inflator 32. Due to the inflator 32 being operated, the inflator 32 generates gas, and that gas is supplied into the multidirectional airbag 30. Further, in the present embodiment, the inflator 32 is a cylindrical inflator, and is disposed within the module case 34 with the seat transverse direction being the length direction thereof. Operation of the inflator 32 is controlled by the ECU 80 that is described later.

<Module Case>

As shown in FIG. 2 and FIG. 6, the module case 34 is disposed at the rear portion of the headrest 18, and covers the rear portion of the headrest 18 from the upper side and the left and right both sides, and structures the design of the rear portion of the headrest 18. Further, as seen in a front view, the module case 34 projects-out further upward than the upper end of the headrest 18, and juts-out toward the seat transverse direction both sides with respect to the headrest 18.

The module case 34 is structured with the main portions thereof being a base portion 34B, a main wall 34M, and a pair of left and right side walls 34S. The base portion 34B is formed substantially in the shape of a plate whose plate thickness direction is the vertical direction, and extends in the seat transverse direction. The base portion 34B is fixed to a cushion member (pad) 18C of the headrest 18.

The main wall 34M extends-out upward from the rear end of the base portion 34B, and structures the rear wall of the module case 34. Concretely, the main wall 34M is tilted forward such that the upper end thereof is positioned at the front side with respect to the lower end thereof that is fixed on the seatback 16, and, as seen in side view, the main wall 34M is formed in a curved shape that is convex rearward and upward. Further, as seen in a front view, the main wall 34M projects-out further upward than the upper end of the headrest 18, and juts-out toward the seat transverse direction both sides with respect to the headrest 18.

A space is formed between the main wall 34M and the headrest 18. The multidirectional airbag 30 that is in a folded-up state is accommodated within this space. Further, there is a structure in which the multidirectional airbag 30 that is in the process of inflating and expanding passes-through between the headrest 18 and the upper end portion of the main wall 34M. At the multidirectional airbag 30 that is in the inflated in expanded state, the connecting portion 52B (see FIG. 7) of the rear expanding portion 52 passes-through between the headrest 18 and the upper end portion of the main wall 34M.

The pair of side walls 34S extend-out toward the front from the seat transverse direction both ends of the main wall 34M, and, as seen in a side view, cover the rear portion of the headrest 18. This is a structure in which the lateral expanding portions 38 of the multidirectional airbag 30 that is in an inflated and expanded state (the portions in vicinities of the borders with the rear expanding portion 52) pass between the pair of side walls 34S and the headrest 18.

Moreover, the multidirectional airbag 30 is rolled outwardly and accommodated within the module case 34. Outward rolling is a form of folding in the shape of a roll from the front end side toward the upper side and the rear side such that the multidirectional airbag 30 is folded-up in the direction opposite the process of expansion shown in FIG. 6. In other words, as shown by the imaginary lines in FIG. 6, outward rolling is a form of folding in which, in the expansion process of the multidirectional airbag 30, a rolled portion 30R is positioned at the outer side (the side opposite the head portion H side). At the multidirectional airbag 30 at which the lateral expanding portions 38 are sewn to the upper expanding portion 48 and to the rear expanding portion 52 as described above, the lateral expanding portions 38 are folded-in within rolls in the stage in which the front expanding portion 36 and the upper expanding portion 48 are folded by outward rolling.

At least a portion of the multidirectional airbag 30 that is in the folded-up state is disposed at the rear of the upper portion 18SU and the intermediate portion 18SC of the headrest stay 18S of the headrest 18. At the headrest 18 of this embodiment, the cushion member (pad) 18C, that is at the rear of the upper portion 18SU and the intermediate portion 18SC at the headrest stay 18S, is formed to be thin, and an accommodating space for a folded-up state is formed between this cushion member 18C and the module case 34. Further, when the multidirectional airbag 30 receives a supply of gas, the multidirectional airbag 30 is inflated and expanded from between the cushion member 18C and the module case 34 toward the exterior of the module case 34. This is a structure in which, at this time, the main wall 34M of the module case 34 supports the multidirectional airbag 30, which is in the process of inflating and expanding, from the rear side (the main wall 34 receives the reaction force that is directed toward the front). Further, this is a structure in which, at this time, owing to the shape thereof that is curved as seen in a side view as described above, the main wall 34M of the module case 34 guides the multidirectional airbag 30, which is in the process of inflating and expanding, toward the front side (the upper front side). Accordingly, the main wall 34M in this embodiment functions as a supporting wall and a guiding wall.

Further, the expansion guiding cloth 58 is folded-up and accommodated together with the multidirectional airbag 30 within the module case 34. At this expansion guiding cloth 58, the base portion, that is disposed at the outer side (the main wall 34M side) with respect to the multidirectional airbag 30 that is outwardly-roll folded, is connected to the inflator 32 or to the portion of the multidirectional airbag 30 which portion is at the gas introducing portion 54G side (see FIG. 7) that is the base end side. On the other hand, the distal end side of the expansion guiding cloth 58 is disposed at the inner side (the headrest 18 side) of the rolled portion 30R of the multidirectional airbag 30, so as to cover the rolled portion 30R in the direction (the counterclockwise direction) opposite the direction of rolling (the clockwise direction in FIG. 6).

Further, as shown by the imaginary lines in FIG. 6, as the multidirectional airbag 30 inflates and expands (is unrolled), the expansion guiding cloth 58 is led-out to the exterior of the module case 34, and is expanded between the multidirectional airbag 30 and the ceiling of the vehicle chamber before the multidirectional airbag 30. Further, the coefficient of friction of the expansion guiding cloth 58 with respect to the multidirectional airbag 30 is set to be smaller than that of the material of the ceiling of the vehicle. In the present embodiment, the surface of the vehicle compartment ceiling side of the expansion guiding cloth 58 is coated with silicon, and the surface of the expansion guiding cloth 58 which surface contacts the multidirectional airbag 30 is a low-friction surface that is not coated with silicon.

Figure 5A:
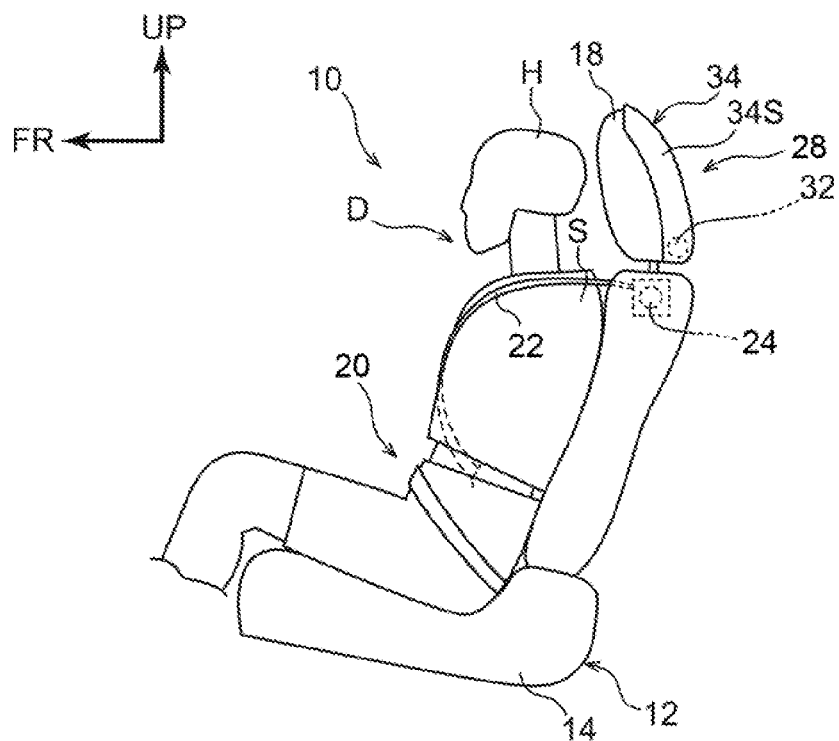
FIG. 5A is a side view showing substantially the entire structure, before operation, of the multidirectional airbag device shown in FIG. 2.
Figure 5B:
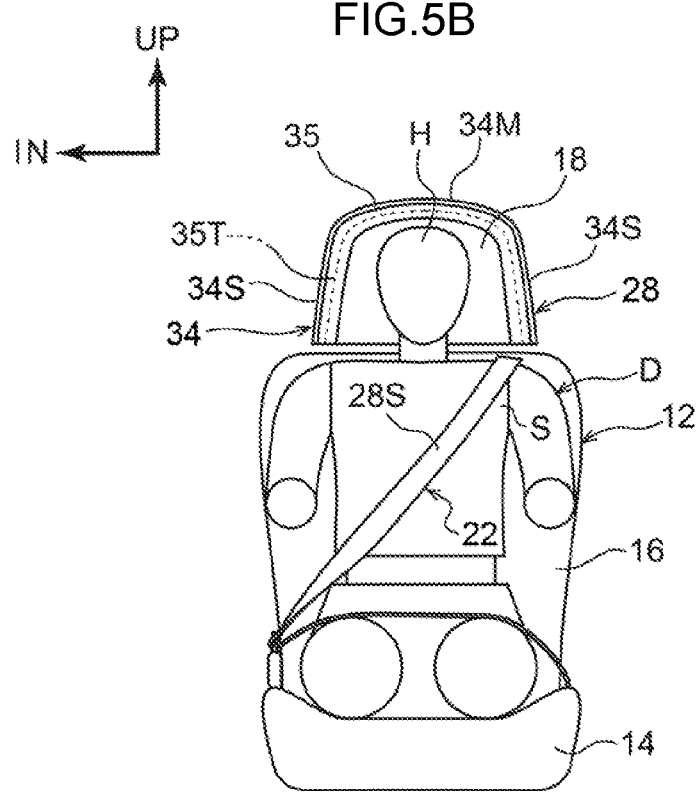
FIG. 5B is a front view showing substantially the entire structure, before operation, of the multidirectional airbag device shown in FIG. 2.

As shown in FIG. 5B, as seen in a front view, the region between the module case 34 and the headrest 18 is closed by an airbag door 35. This is a structure in which, due to a tear line 35T, that is formed at the airbag door 35, rupturing due to the expansion pressure of the multidirectional airbag 30, inflation and expansion of the multidirectional airbag 30 toward the front side is permitted.

(Structure of Position Changing Device)

As shown in FIG. 1, the position changing device 60 is provided within the upper portion of the seatback 16. The position changing device 60 is structured with a tilting mechanism portion 62 being the main portion thereof. Due to the tilting mechanism portion 62, the headrest stay 18S is rotated around the connecting pin P1, and the headrest 18 and the module case 34 are tilted toward one side or the other side in the seat transverse direction. Concrete description thereof is given hereinafter.

The tilting mechanism portion 62 is disposed at the rear side with respect to the lower portion 18SL of the headrest stay 18S. The tilting mechanism portion 62 is structured to include a motor 64 that serves as a "driving member", and a slider 70 that serves as a "moving member".

In the present embodiment, the motor 64 is structured as a stepping motor, and has a motor main body 64A and a feed screw 64B (an element that can be interpreted as a "feed mechanism portion" in the broad sense) that structures the rotating shaft of the motor 64. The motor main body 64A is formed substantially in the shape of a solid cylinder, and is disposed with the seat transverse direction being the axial direction thereof and at the right side portion of the upper portion of the seatback 16. The motor main body 64A is connected to the seatback frame 16F of the seatback 16 via an unillustrated bracket. Further, the motor 64 is electrically connected to the ECU 80 that is described later, and this is a structure in which the motor 64 is driven and controlled by the ECU 80.

The feed screw 64B is formed substantially in the shape of circular rod, and extends toward the seat left side from the motor main body 64A. The distal end portion of the feed screw 64B is rotatably supported by a holder 68 that is fixed to the seatback frame 16F. Due thereto, there is a structure in which, due to the motor 64 being driven, the feed screw 64B is rotated forward or rotated reversely around its own axis. Moreover, a male screw is formed at the outer peripheral portion of the feed screw 64B.

The slider 70 is formed substantially in the shape of a block at whose inner peripheral portion a female screw is formed, and is disposed coaxially with the feed screw 64B. Further, the female screw of the slider 70 is screwed-together with the male screw of the feed screw 64B. Due thereto, there is a structure in which, due to the feed screw 64B rotating, the slider 70 moves (slides) in the axial direction of the feed screw 64B (i.e., the seat transverse direction). Further, a connecting shaft 70A whose axial direction is the longitudinal direction is formed integrally with the outer peripheral portion of the slider 70. This connecting shaft 70A projects-out toward from the slider 70, and is movably inserted within the connecting groove 18A of the headrest stay 18S. Therefore, the lower portion 18SL of the headrest stay 18S is connected to the slider 70 so as to be able to move relative thereto.

When the slider 70 moves in the axial direction of the feed screw 64B (i.e., the seat transverse direction), the connecting shaft 70A of the slider 70 moves within the connecting groove 18A of the headrest stay 18S, and the lower portion 18SL of the headrest stay 18S is displaced, together with the slider 70, in the axial direction of the feed screw 64B. Moreover, this is a structure in which, when the lower portion 18SL of the headrest stay 18S is displaced in the axial direction of the feed screw 64B, the headrest stay 18S (the headrest 18) rotates around the connecting pin P1 (toward the arrow R direction side and the arrow L direction side in FIG. 1). Concretely, when the feed screw 64B rotates forward, the headrest 18 is set so as to rotate toward the seat right side (toward the arrow R direction side in FIG. 1). On the other hand, when the feed screw 64B rotates reversely, the headrest 18 is set so as to rotate toward the seat left side (toward the arrow L direction side in FIG. 1). Accordingly, there is a structure in which the headrest 18 (i.e., the module case 34) is tilted in the seat transverse direction by operation of the tilting mechanism portion 62. Further, in the present embodiment, the position at which the headrest stay 18S extends along the vertical direction (the position shown in FIG. 1) is the initial position.

(Structure of ECU)

Figure 8:
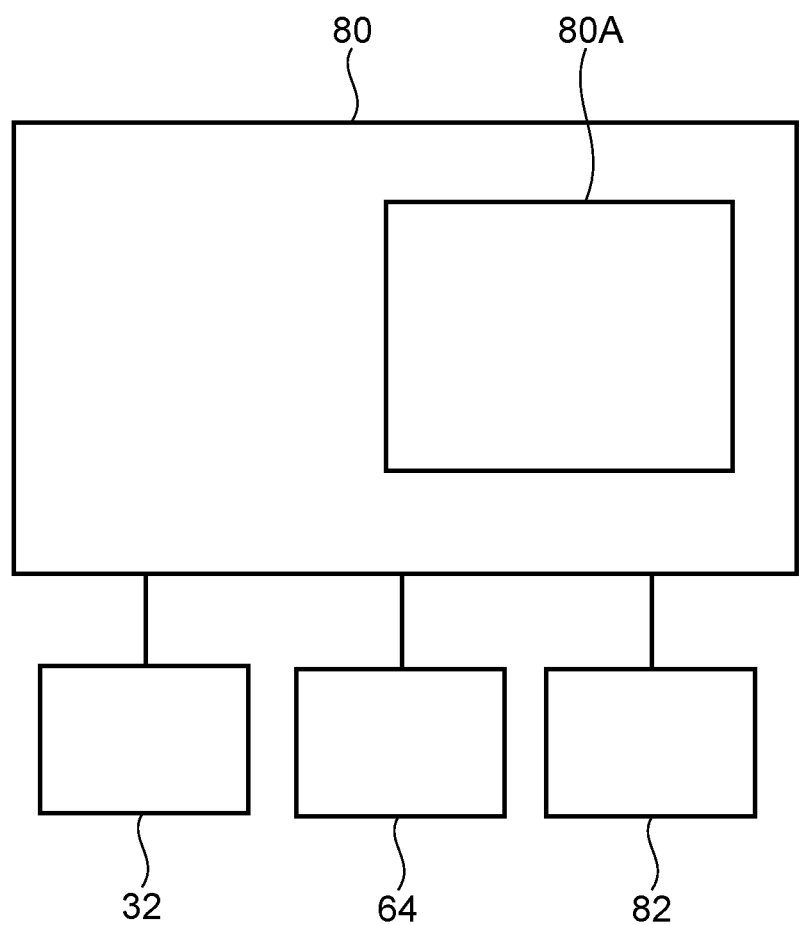
FIG. 8 is a block drawing showing a vehicle control device relating to the present embodiment.

The ECU 80 controls the operations of the above-described multidirectional airbag device 28 and tilting mechanism portion 62. Concretely, as shown in FIG. 8, the inflator 32 of the multidirectional airbag device 28, collision sensors 82 (or a sensor group), and the motor 64 of the tilting mechanism portion 62 are electrically connected to the ECU 80.

The collision sensors 82 are structured to include collision sensing sensors that sense a collision of the vehicle, and a collision predicting sensor for predicting a collision of the vehicle. As an example, the collision sensing sensors are acceleration sensors, and a plurality thereof are provided at the front end portion, the rear end portion, and the left and right both side portions of the vehicle. Further, the collision predicting sensor is structured by a stereo camera, or a radar sensor that uses millimeter-wave radar or the like, or the like. A stereo camera captures images of the periphery (the front and sides) of the vehicle, and detects a collision object that will collide with the vehicle. Further, the stereo camera measures the distance to the detected collision object, the relative speed of the vehicle and the collision object, and the like, and outputs the measured data to the ECU 80. Further, in the same way as a stereo camera, a radar sensor measures the distance to a collision object of the vehicle, the relative speed of the vehicle and the collision object, and the like, and outputs the measured data to the ECU 80.

Figure 9A:
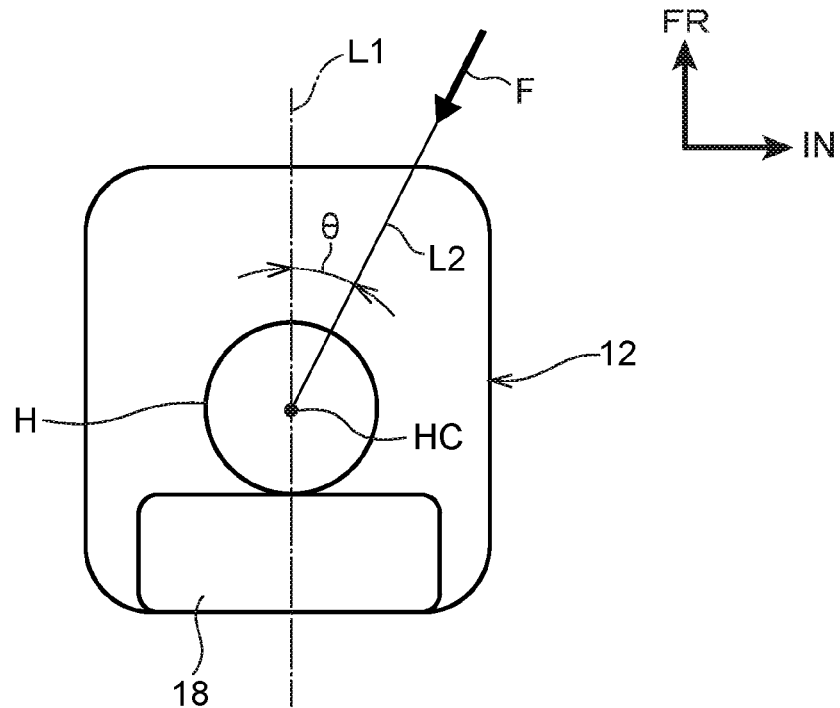
FIG. 9A is an explanatory drawing that is seen from the seat upper side and is for explaining a collision angle in a state in which a vehicle seat is facing toward the vehicle front.
Figure 9B:
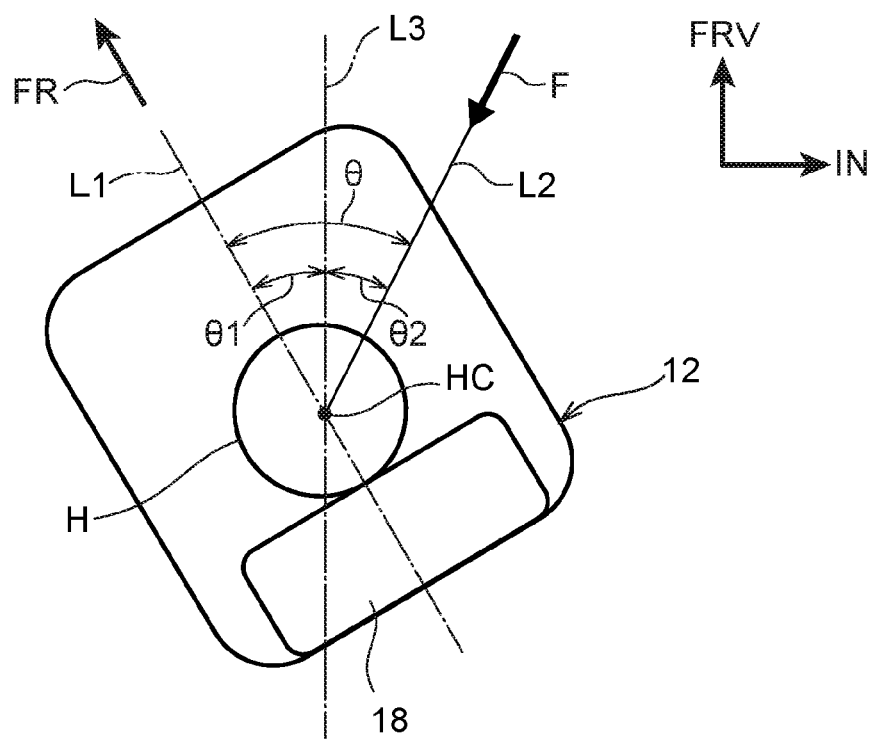
FIG. 9B is an explanatory drawing that is seen from the seat upper side and is for explaining the collision angle at a rotating-type vehicle seat.

Moreover, on the basis of the information from the collision sensors 82, the ECU 80 can sense or predict (the occurrence of or the inevitability of) a collision with respect to the vehicle. This is a structure in which, on the basis of the information from the collision sensor 82, the ECU 80 senses or predicts the direction of the collision of the collision body with the vehicle with respect to the vehicle seat 12, and computes the collision angle of the collision body with respect to the vehicle. The collision angle is set as follows. Namely, as shown in FIG. 9A, a line, that runs along the seat longitudinal direction and passes through center HC of the head portion H of the seated person D at the previously-described reference set position as seen in plan view, is reference line L1. Further, the angle that is formed by this reference line L1 and a line (refer to line L2 that runs along arrow F in FIG. 9A), that runs along the direction of the collision of the collision body with the vehicle, is collision angle $\theta$. Further, clockwise (toward the right) with respect to the reference line L1 is positive, and counterclockwise (toward the left) with respect to the reference line L1 is negative. Therefore, for example, in an oblique collision from the right side with respect to the vehicle seat 12, the collision angle $\theta$ is positive, and, in an oblique collision from the left side with respect to the vehicle seat 12, the collision angle $\theta$ is negative. Note that the ECU 80 senses the direction of the collision of the collision body with the vehicle in accordance with, for example, the collision accelerations in the longitudinal direction and the left-right direction that are detected by the acceleration sensors. Or, for example, the ECU 80 predicts the collision direction of the collision body that is detected by the collision predicting sensor.

When the ECU 80 senses or predicts a collision of the vehicle on the basis of the information from the collision sensors 82, the ECU 80 operates the inflator 32. Further, the ECU 80 computes the collision angle $\theta$ on the basis of the information from the collision sensors 82, and drives the motor 64 in accordance with the computed collision angle $\theta$. Concretely, in a case in which the value of the collision angle $\theta$ is positive, the ECU 80 drives and controls the motor 64 so as to rotate the feed screw 64B forward. On the other hand, in a case in which the value of the collision angle $\theta$ is negative, the ECU 80 drives the motor 64 so as to rotate the feed screw 64B reversely. Moreover, as shown in FIG. 8, the ECU 80 has a storage portion 80A (a memory). Driving data for driving and controlling the motor 64 is stored in the storage portion 80A. Concretely, for example, the number of rotations of the feed screw 64B at the time of driving and controlling the motor 64 by the ECU 80, or the like, is stored per collision angle $\theta$ in the storage portion 80A. Further, this is a structure in which the ECU 80 drives the motor 64 on the basis of the driving data stored in the storage portion 80A. Note that the driving data that is stored in the storage portion 80A is obtained, for example, from various types of crash tests or simulations or the like.

Operation and effects of the present embodiment are described next.

In the passenger protecting device 10 that is structured as described above, at the time when the ECU 80 senses or predicts a collision with respect to the vehicle, the ECU 80 computes the collision angle $\theta$ of the collision body on the basis of information from the collision sensors 82. Here, in a case in which the collision with respect to the vehicle is a front collision, the head portion H of the seated person D starts to be displaced mainly from the reference set position toward the seat front side due to inertial force. At this time, because the belt 22 of the seatbelt device 20 is applied to the seated person D, displacement of the head portion H toward the front side is suppressed. Further, in a case in which the collision with respect to the vehicle is a front collision, the collision angle $\theta$ is substantially "0", and therefore, the ECU 80 operates the inflator 32 of the multidirectional airbag device 28 without operating the motor 64. Due thereto, as shown in FIG. 2 and FIG. 3, the multidirectional airbag 30 of the multidirectional airbag device 28 is inflated and expanded so as to surround the head portion H of the seated person D. Accordingly, the head portion H of the seated person D can be restrained by the multidirectional airbag 30.

On the other hand, in a case in which the collision with respect to the vehicle is an oblique collision or a side collision from the right side (or the left side), the head portion H of the seated person D starts to be displaced from the reference set position toward the seat right side (or left side) that is the collision side, due to inertial force. Further, in this case, because the collision angle $\theta$ of the collision body is positive (or negative), the ECU 80 causes the motor main body 64A to operate before the inflator 32 of the multidirectional airbag device 28. Concretely, on the basis of the driving data that is stored in the storage portion 80A, the ECU 80 drives the motor 64 so as to cause the feed screw 64B to rotate forward (or rotate reversely). Then, the ECU 80 operates the inflator 32 of the multidirectional airbag device 28.

Due thereto, the headrest 18 (the module case 34) is set in a state of being tilted toward the seat right side (or left side) from the initial position. In detail, the upper end portion of the headrest 18 enters into a state of being offset toward the seat right side (or left side) with respect to the initial position. Further, in this state, because the multidirectional airbag 30 is inflated and expanded toward the front side with respect to the headrest 18, the multidirectional airbag 30 is inflated and expanded at a position that is offset toward the seat right side (or left side) as compared with when the headrest 18 is disposed at the initial position. Namely, the inflated and expanded position of the multidirectional airbag 30 is shifted in the same direction as the head portion H of the seated person D that is displaced toward the seat right side (or left side). Due thereto, the multidirectional airbag 30 can be inflated and expanded so as to surround the head portion H of the seated person D, while an increase in the size of the multidirectional airbag 30 in the seat transverse direction is suppressed.

Figure 10A:
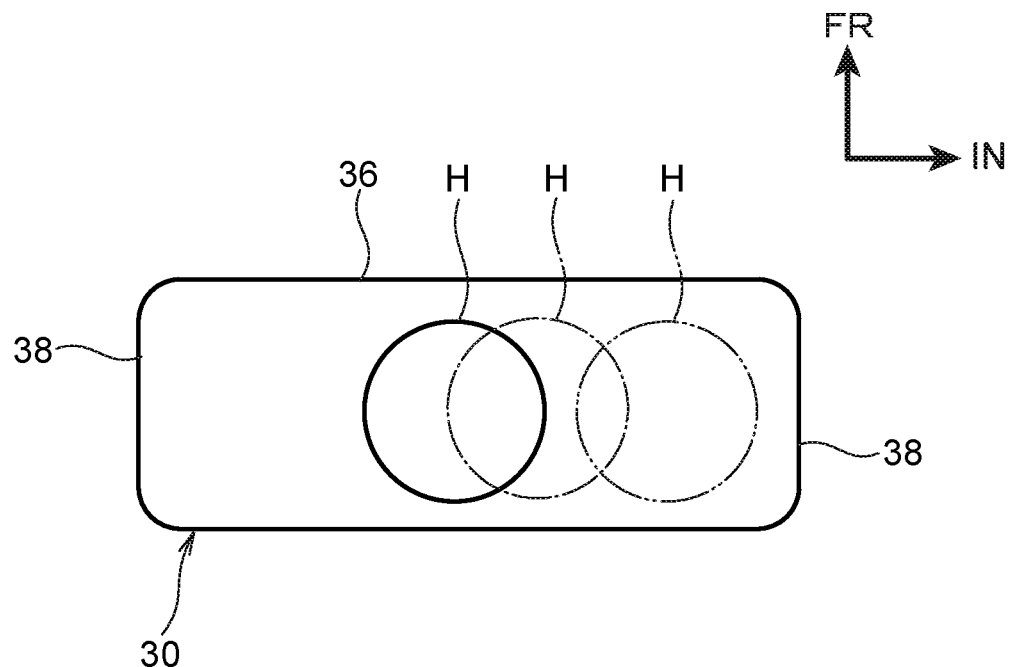
FIG. 10A is an explanatory drawing for explaining the relationship between a multidirectional airbag of a comparative example and the head portion of the seated person.

This point will be described further hereinafter in comparison with a comparative example that does not have the position changing device 60. Namely, in the comparative example, because the position changing device 60 is not provided, the inflated and expanded position of the multidirectional airbag 30 cannot be shifted in the seat transverse direction. Due thereto, as shown in FIG. 10A, in order for the multidirectional airbag 30 to be applied to the head portion H even at the time of an oblique collision or at the time of a side collision, the transverse dimension of the multidirectional airbag 30 in the seat transverse direction must be set to a dimension that corresponds to the position of the head portion H that is displaced the most in the seat transverse direction. Here, in FIG. 10A, the head portion H that is shown by the one-dot chain line shows the position in the seat transverse direction except for the component in the seat longitudinal direction of the head portion H at the time of an oblique collision, and the head portion H shown by the two-dot chain line shows the position of the head portion H at the time of a side collision. Therefore, the build of the multidirectional airbag 30 in the seat transverse direction tends to become large. Accordingly, for example, at the time of an oblique collision in which the collision angle θ is relatively small, the amount of displacement of the head portion H in the seat transverse direction is relatively small, and therefore, the gap between the head portion H and the multidirectional airbag 30 in the seat transverse direction is relatively wide. Further, because the head portion H is not restrained by the multidirectional airbag 30 until the head portion H hits the lateral expanding portion 38 of the multidirectional airbag 30, the time until the head portion H is restrained by the multidirectional airbag 30 is relatively long.

Figure 10B:
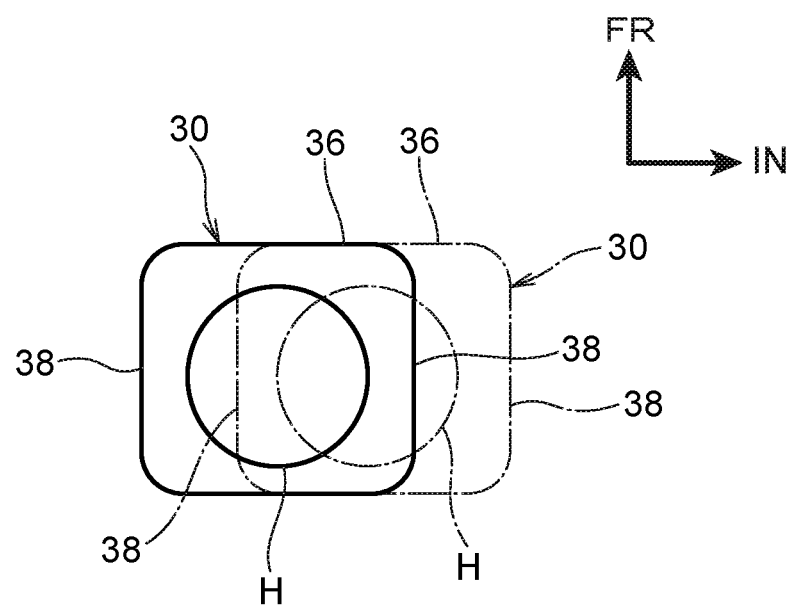
FIG. 10B is an explanatory drawing for explaining the relationship between the multidirectional airbag of the first embodiment and the head portion of the seated person.

In contrast, in the present embodiment, as described above, in the case of an oblique collision or a side collision, the inflated and expanded position of the multidirectional airbag 30 is shifted in the same direction in the seat transverse direction, in correspondence with the head portion H of the seated person D that is displaced in the seat transverse direction. Therefore, as shown in FIG. 10B, the multidirectional airbag 30 that is inflated and expanded can be applied to the head portion H of the seated person D, while an increase in size of the multidirectional airbag 30 in the seat transverse direction is suppressed. In other words, the build (the lateral width) of the multidirectional airbag 30 can be set to a build (a lateral width) that is appropriate for the head portion H. Due thereto, the head portion H of the seated person D can be restrained by the multidirectional airbag 30 at an early stage, not only in the case of a side collision, but also in the case of an oblique collision.

Further, in the present embodiment, the tilting mechanism portion 62 has the motor 64, and the motor 64 is structured by a stepping motor. Therefore, the amount of rotation of the headrest 18 (the module case 34) at the time of operation of the tilting mechanism portion 62 can be set finely. Accordingly, the amount of rotation of the headrest 18 (the module case 34) that corresponds to the collision angle θ can be set finely, and accordingly, the position of the multidirectional airbag 30 in the seat transverse direction can easily be set finely.

Further, in the present embodiment, the slider 70 is screwed-together with the feed screw 64B of the motor 64. Due to the feed screw 64B rotating, the slider 70 moves in the axial direction of the feed screw 64B, and the headrest 18 (the module case 34) is rotated around the connecting pin P1. Due thereto, by changing the pitch of the male screw of the feed screw 64B and the female screw of the slider 70, the amount of movement of the slider 70 per one rotation of the feed screw 64B can be changed easily. As a result, the rotational speed of the headrest 18 (the module case 34) can be easily adjusted at the time of setting.

Note that, in the present embodiment, the motor 64 of the tilting mechanism portion 62 is structured by a stepping motor, but the motor may be changed to a DC motor or the like. In this case, for example, there may be a structure in which a gear train for connecting the rotating shaft of the motor and the feed screw is provided between the rotating shaft and the feed screw, and the feed screw is rotated by driving of the motor.

Second Embodiment

Figure 11:
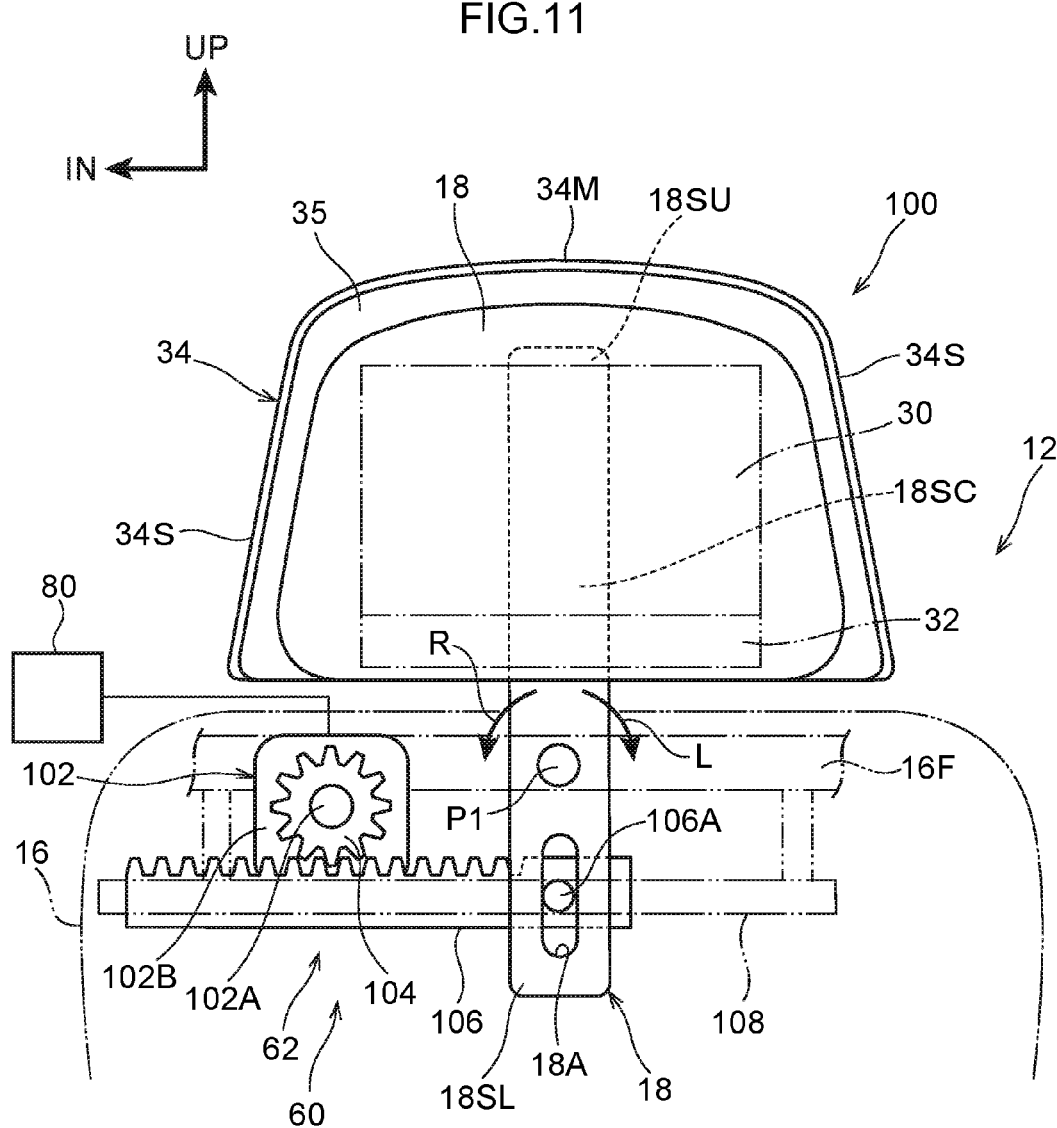
FIG. 11 is a front view schematically showing a position changing device that is used in a passenger protecting device relating to a second embodiment.

A passenger protecting device 100 of a second embodiment is described hereinafter by using FIG. 11. The passenger protecting device 100 of the second embodiment is structured similarly to the first embodiment except for the following points. Note that FIG. 11 shows the upper portion of the vehicle seat 12 schematically in a front view. Further, in FIG. 11, the same reference numerals are applied to members that are structured similarly to the first embodiment.

In the second embodiment, the tilting mechanism portion 62 of the position changing device 60 is structured by a rack-and-pinion mechanism. Namely, the tilting mechanism portion 62 is structured to include a motor 102 and a pinion 104 that serve as a "driving member", and a rack 106 that serves as a "moving member". The motor 102 is disposed at the right side portion of the upper portion of the seatback 16 with the longitudinal direction being the axial direction thereof, and is connected to the seatback frame 16F by an unillustrated bracket. Further, a rotating shaft 102A of the motor 102 projects-out forward from a main body portion 102B of the motor 102. The pinion 104 is provided so as to be able to rotate integrally with the rotating shaft 102A. Further, plural pinion gears are formed at the outer peripheral portion of the pinion 104. The motor 102 is electrically connected to the ECU 80, and there is a structure in which the motor 102 is driven and controlled by the ECU 80.

The rack 106 is disposed at the lower side of the pinion 104, and extends in the seat transverse direction. The rack 106 is connected to a rail 108, which is fixed to the seatback frame 16F, so as to be slidable in the seat transverse direction. Further, plural rack gears are formed at the upper portion of the rack 106, and the rack gears and the pinion gears of the pinion 104 are meshed-together. Moreover, a connecting shaft 106A whose axial direction is the longitudinal direction is formed integrally with the end portion of the rack 106 at the seat left side. The connecting shaft 106A projects-out forward from the rack 106, and is slidably inserted within the connecting groove 18A of the headrest stay 18S. Due thereto, in the same way as in the first embodiment, the lower portion 18SL of the headrest stay 18S is connected to the rack 106 so as to be able to move relative thereto.

Further, when the motor 102 is driven by control of the ECU 80, the rotating shaft 102A of the motor 102 and the pinion 104 are rotated forward or rotated reversely, and the rack 106, that is meshed-together with the pinion 104, moves in the seat transverse direction with respect to the rail 108. When the rack 106 moves in the seat transverse direction, the lower portion 18SL of the headrest 18 is displaced in the seat transverse direction together with the rack 106, while the connecting shaft 106A of the rack 106 moves within the connecting groove 18A of the headrest stay 18S. Therefore, the headrest 18 (the module case 34) rotates around the connecting pin P1 (toward the arrow R direction side or the arrow L direction side shown in FIG. 11). Due thereto, due to operation of the tilting mechanism portion 62, the headrest 18 (the module case 34) tilts toward a seat transverse direction one side or other side with respect to the initial position. Accordingly, in the second embodiment as well, in the same way as in the first embodiment, the inflated and expanded position of the multidirectional airbag 30 in the seat transverse direction can be shifted. Due to the above, in the second embodiment as well, the multidirectional airbag 30 can be inflated and expanded so as to surround the head portion H of the seated person D, while an increase in size of the multidirectional airbag 30 in the seat transverse direction is suppressed. Accordingly, the head portion H of the seated person D can be restrained by the multidirectional airbag 30 at an early stage, not only in the case of a side collision, but also in the case of an oblique collision.

Third Embodiment

Figure 12:
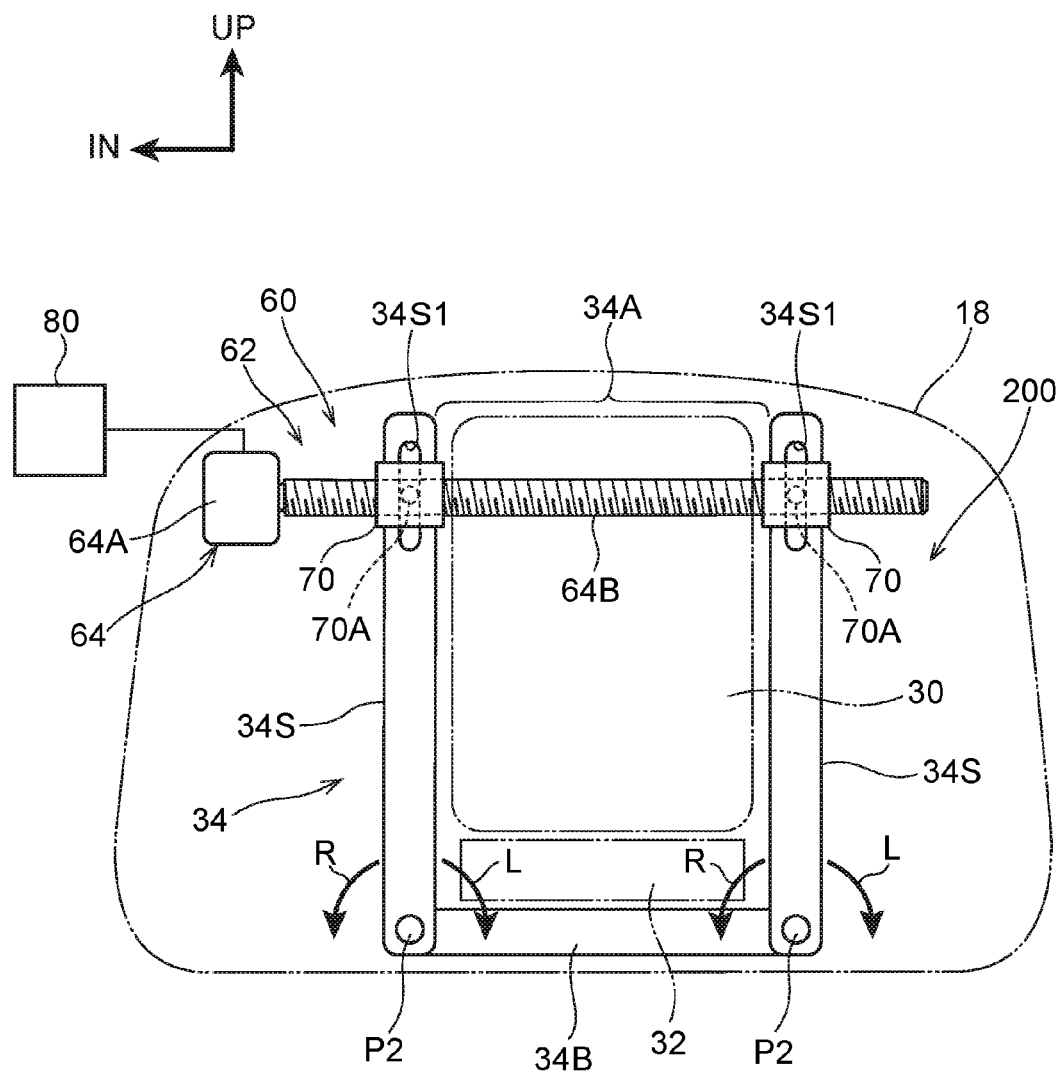
FIG. 12 is a front view schematically showing a position changing device that is used in a passenger protecting device relating to a third embodiment.

A passenger protecting device 200 of a third embodiment is described hereinafter by using FIG. 12. The passenger protecting device 200 of the third embodiment is structured similarly to the first embodiment except for the following points. Note that FIG. 12 shows the passenger protecting device 200, which is disposed at the interior of the headrest 18, schematically in a front view. Further, in FIG. 12, the same reference numerals are applied to members that are structured similarly to the first embodiment.

In the third embodiment, there is a structure in which the multidirectional airbag 30 is expanded only from above the headrest 18. Namely, although not illustrated, an airbag door is provided at the upper end portion of the headrest 18. A tear line, which is ruptured by inflation pressure of the multidirectional airbag 30, is formed in the airbag door along the seat transverse direction. Further, although not illustrated, the lower portion 18SL of the headrest stay 18S is fixed to the seatback frame 16F of the seatback 16. Namely, in the third embodiment, the headrest 18 is connected to the seatback 16 by the headrest stay 18S such that the headrest 18 is unable to rotate.

Further, in the third embodiment, the pair of left and right side walls 34S of the module case 34 are disposed at the interior of the headrest 18, and are structured by bodies that are separate from the base portion 34B. The lower end portions of the side walls 34S are rotatably connected to the seat transverse direction outer side end portions of the base portion 34B by connecting pins P2 whose axial direction is the longitudinal direction. Moreover, connecting grooves 34S1 that extend in the vertical direction are formed in the upper end portions of the side walls 34S. The connecting grooves 34S1 are formed so as to pass-through in the longitudinal direction. Further, in the third embodiment, the position at which the pair of left and right side walls 34S are disposed along the vertical direction is the initial position. Further, the region between the upper end portions of the pair of left and right side walls 34S is an opening portion 34A of the module case 34, and the multidirectional airbag 30 that is in the process of inflating and expanding passes-through the opening portion 34A.

Moreover, the tilting mechanism portion 62 of the position changing device 60 is provided at the interior of the upper portion of the headrest 18, and is disposed at the front side of the module case 34. Concretely, the motor main body 64A of the motor 64 is disposed at the right side portion of the upper portion of the headrest 18. Further, the feed screw 64B extends-out toward the seat left side from the motor main body 64A. The distal end portion of the feed screw 64B is rotatably supported by an unillustrated holder that is fixed to the headrest stay 18S (not illustrated in FIG. 12).

Further, in the third embodiment, the tilting mechanism portion 62 has a pair of the sliders 70 in correspondence with the pair of left and right side walls 34S. Moreover, the connecting shafts 70A of the sliders 70 project-out toward the seat rear side from the sliders 70, and are movably inserted within the connecting grooves 34S1 of the side walls 34S. Due thereto, the upper end portions of the side walls 34S are connected to the sliders 70 so as to be able to move relative thereto. Further, when the feed screw 64B rotates, the pair of sliders 70 move in the same direction in the axial direction of the feed screw 64B, and the connecting shafts 70A of the sliders 70 move within the connecting grooves 34S1 of the side walls 34S, and the upper end portions of the pair of side walls 34S are, together with the sliders 70, displaced in the same direction in the axial direction of the feed screw 64B. Due thereto, there is a structure in which the pair of side walls 34S respectively rotate in the same direction around the connecting pins P2, and the position of the opening portion 34A of the module case 34 is shifted in the seat transverse direction. Concretely, due to the feed screw 64B rotating forward, the pair of sliders 70 move toward the seat right side, and the pair of side walls 34S rotate around the connecting pins P2 toward the seat right side (toward the arrow R direction side shown in FIG. 12), and the position of the opening 34A is set so as to be shifted toward the seat right side. On the other hand, due to the feed screw 64B rotating reversely, the pair of sliders 70 move toward the seat left side, and the pair of side walls 34S rotate around the connecting pins P2 toward the seat left side (toward the arrow L direction side shown in FIG. 12), and the position of the opening portion 34A is set so as to be shifted toward the seat left side. Therefore, there is a structure in which, due to operation of the tilting mechanism portion 62, the pair of left and right side walls 34S at the module case 34 tilt in the seat transverse direction, and the opening portion 34A of the module case 34 is shifted in the seat transverse direction.

Here, when the motor 64 is driven by control of the ECU 80 at the time when the ECU 80 senses or predicts a collision of the vehicle, the feed screw 64B rotates forward or rotates reversely, and the pair of sliders 70 are moved in the axial direction of the feed screw 64B (toward the seat right side or the seat left side). Therefore, as described above, accompanying the movement of the sliders 70, the upper end portions of the side walls 34S at the module case 34 are displaced, and the side walls 34S are rotated around the connecting pins P2. Due thereto, the pair of side walls 34S of the module case 34 tilt in the seat transverse direction.

On the other hand, when the inflator 32 operates and the multidirectional airbag 30 is inflated and expanded, because the side walls 34S are disposed at the seat transverse direction both sides of the multidirectional airbag 30, this works such that the inflation and expansion of the multidirectional airbag 30 is guided by the pair of side walls 34S. Further, in the state in which the pair of side walls 34S are tilted in the seat transverse direction with respect to the initial position, the opening portion 34A of the module case 34 is in a state of being offset in the seat transverse direction. Therefore, due to the inflator 32 being operated in this state, the multidirectional airbag 30 is inflated and expanded while offset toward the seat right side or the seat left side, as compared with the state in which the pair of side walls 34S are disposed at the initial position. Accordingly, in the third embodiment as well, in the same way as in the first embodiment, the inflated and expanded position of the multidirectional airbag 30 in the seat transverse direction can be shifted. Due to the above, in the third embodiment as well, the multidirectional airbag 30 can be inflated and expanded so as to surround the head portion H of the seated person D, while an increase in size of the multidirectional airbag 30 in the seat transverse direction is suppressed. Accordingly, the head portion H of the seated person D can be restrained by the multidirectional airbag 30 at an early stage, not only in the case of a side collision, but also in the case of an oblique collision.

Fourth Embodiment

Figure 13:
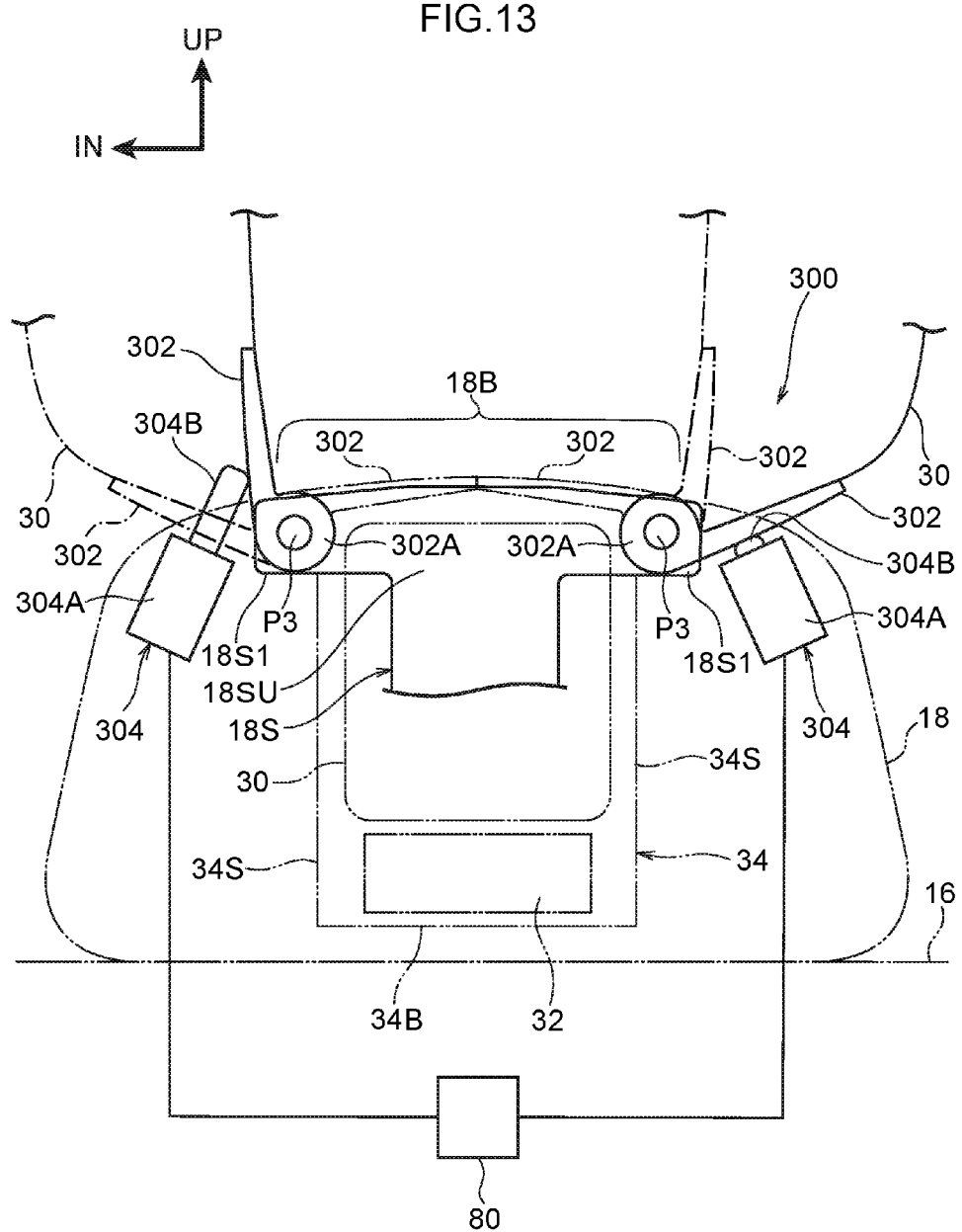
FIG. 13 is a front view schematically showing a position changing device that is used in a passenger protecting device relating to a fourth embodiment.

A passenger protecting device 300 of a fourth embodiment is described hereinafter by using FIG. 13. The passenger protecting device 300 of the fourth embodiment is structured similarly to the first embodiment except for the following points. Note that FIG. 13 shows the passenger protecting device 300, which is disposed at the interior of the headrest 18, schematically in a front view. Further, in FIG. 13, the same reference numerals are applied to members that are structured similarly to the first embodiment.

In the fourth embodiment, in the same way as in the third embodiment, there is a structure in which the module case 34 is disposed at the interior of the headrest 18, and the multidirectional airbag 30 is inflated and expanded only from above the headrest 18. Further, an opening portion 18B, through which the multidirectional airbag 30 passes in the process of the inflation and expansion thereof, is formed in the upper end portion of the headrest 18. The opening portion 18B is disposed at the upper side of the module case 34. Further, although not illustrated, in the fourth embodiment as well, in the same way as in the third embodiment, the lower portion 18SL of the headrest stay 18S is fixed to the seatback frame 16F of the seatback 16, and the headrest 18 is connected to the seatback 16 by the headrest stay 18S such that the headrest 18 is unable to rotate. Further, a pair of supporting portions 18S1 that project-out toward the seat transverse direction outer sides are formed integrally with the upper end portion of the headrest stay 18S.

Moreover, in the fourth embodiment, the tilting mechanism portion 62 is omitted at the position changing device 60, and the position changing device 60 is structured to include airbag doors 302 that serve as a pair of "cover portions", and a pair of actuators 304 that serve as "adjusting members". The pair of airbag doors 302 are disposed at positions that are symmetrical to the left and the right with respect to a central line (not illustrated) in the transverse direction of the headrest 18, and close the opening portion 18B of the headrest 18. Concretely, the airbag doors 302 are formed in the shapes of plates whose plate thickness direction is substantially the vertical direction, and are disposed at the upper side of the module case 34 (refer to the airbag doors 302 that are shown by the two-dot chain lines in FIG. 13).

Further, connecting portions 302A that bulge-out toward the lower side are formed at the seat transverse direction outer side end portions of the airbag doors 302. The connecting portions 302A are rotatably connected to the supporting portions 18S1 of the headrest stay 18S by connecting pins P3 whose axial direction is the longitudinal direction. Moreover, there is a structure in which, in the state in which the opening portion 18B is closed by the pair of airbag doors 302, the airbag doors 302 are held by the headrest 18. Further, there is a structure in which, due to the airbag doors 302 being pushed toward the upper side by the multidirectional airbag 30 at the time when the multidirectional airbag 30 is inflated and expanded, the airbag doors 302 are rotated toward the upper side around the connecting pins P3, and the opening portion 18B is opened. In the present embodiment, the opening angle of the airbag doors 302 is set to approximately 160° at the time when the airbag doors 302 are rotated the most (the position of the airbag door 302 that is disposed at the right side and is shown by the one-dot chain line, and of the airbag door 302 that is disposed at the left side and is shown by the solid line, and this position is called the "maximum open position" hereinafter).

The actuator 304 is structured to include an actuator main body 304A, and a cylinder 304B that is extended-out from the actuator main body 304A. The actuator main body 304A is provided at the seat transverse direction outer side with respect to the airbag door 302. Further, the actuator main body 304A is disposed so as to be tilted toward the seat transverse direction inner side while heading toward the upper side, as seen in a front view. The actuator main body 304A is fixed to the headrest stay 18S via an unillustrated bracket.

The cylinder 304B is formed substantially in the shape of a solid cylinder, and is disposed at the interior of the actuator main body 304A. At the time of operation of the actuator 304, the cylinder 304B is made to project-out from the actuator main body 304A toward the upper side and the seat transverse direction inner side as seen in a front view.

Further, there is a structure in which, when the airbag doors 302 rotate around the connecting pins P3 and the opening portion 18B of the headrest 18 is opened, due to the airbag doors 302 hitting the cylinders 304B of the actuators 304, rotation of the airbag doors 302 is restricted (limited). Due thereto, there is a structure in which the respective opening angles of the left and right airbag doors 302 at the time of inflation and expansion of the multidirectional airbag 30 change due to the amounts of projection of the cylinders 304B from the actuator main bodies 304A being changed.

For example, as shown by the solid lines in FIG. 13, the opening angle of the airbag door 302 at the seat right side can be set to a predetermined angle due to only the actuator 304 at the seat right side being operated. Further, for example, as shown by the one-dot chain line in FIG. 13, the opening angle of the airbag door 302 at the seat left side can be made to be a predetermined angle due to only the actuator 304 at the seat left side being operated.

Further, the actuators 304 are electrically connected to the ECU 80, and there is a structure in which the actuators 304 are operated by the ECU 80. Concretely, the amounts of projection of the cylinders 304B from the actuator main bodies 304A are controlled by control of the actuators 304. Further, data regarding the amounts of projection of the cylinders 304B at the left and right actuators 304 are stored per collision angle θ in the storage portion 80A (not illustrated in FIG. 13) of the ECU 80, and there is a structure in which the actuators 304 operate on the basis of this data.

Further, when the ECU 80 senses or predicts a collision with respect to the vehicle, the ECU 80 operates the inflator 32, and, on the basis of the data stored in the storage portion 80A of the ECU 80, the ECU 80 operates the actuators 304. Due thereto, the multidirectional airbag 30 is inflated and expanded, the pair of left and right airbag doors 302 rotate around the connecting pins P3, and the opening portion 18B of the headrest 18 is opened. Further, when the airbag doors 302 are rotated, the airbag doors 302 abut the cylinders 304B of the actuators 304, and rotation of the airbag doors 302 is restricted.

Further, for example, as shown by the solid lines in FIG. 13, when the airbag door 302 at the seat right side is rotated such that the opening angle thereof becomes approximately 90° and the airbag door 302 at the seat left side is rotated to the maximum open position, this works so as to move the multidirectional airbag 30, after inflation and expansion, toward the seat left side by the airbag door 302 at the seat right side (refer to the multidirectional airbag 30 shown by the solid line in FIG. 13). Therefore, the inflated and expanded position of the multidirectional airbag 30 is shifted toward the seat left side.

On the other hand, for example, as shown by the one-dot chain lines in FIG. 13, when the airbag door 302 at the seat left side is rotated such that the opening angle thereof becomes approximately 90° and the airbag door 302 at the seat right side is rotated to the maximum open position, this works so as to move the multidirectional airbag 30, after inflation and expansion, toward the seat right side by the airbag door 302 at the seat left side (refer to the multidirectional airbag 30 shown by the one-dot chain line in FIG. 13). Therefore, the inflated and expanded position of the multidirectional airbag 30 is shifted toward the seat right side. Accordingly, in the fourth embodiment as well, in the same way as in the first embodiment, the inflated and expanded position of the multidirectional airbag 30 in the seat transverse direction can be shifted. Due to the above, in the fourth embodiment as well, the multidirectional airbag 30 can be inflated and expanded so as to surround the head portion H of the seated person D, while an increase in size of the multidirectional airbag 30 in the seat transverse direction is suppressed. Accordingly, the head portion H of the seated person D can be restrained by the multidirectional airbag 30 at an early stage, not only in the case of a side collision, but also in the case of an oblique collision.

Note that, in the first embodiment through the fourth embodiment, the vehicle seat 12 is disposed in a state in which the seat front side of the vehicle seat 12 and the vehicle front side of the vehicle coincide, and the passenger protecting device 10, 100, 200, 300 is applied to this vehicle seat. Instead, the passenger protecting device 10, 100, 200, 300 may be applied to a vehicle that can be driven automatically and in which a rotating-type vehicle seat is installed. In this case, there is a structure in which the rotating-type vehicle seat is rotatably connected to the vehicle body of the vehicle with the vertical direction being the axial direction. Further, in this case as well, the ECU 80 computes the collision angle θ of the collision body with respect to the vehicle seat in accordance with the reference line L1 that runs along the seat longitudinal direction of the vehicle seat. This point is described hereinafter by using FIG. 9B. Note that, in FIG. 9B, the vehicle front of the vehicle is indicated by arrow FRV, and the vehicle transverse direction central side of the vehicle is indicated by arrow IN.

As shown in this drawing, first, the line that runs along the vehicle longitudinal direction of the vehicle is vehicle longitudinal direction reference line L3. The angle that is formed by the vehicle longitudinal direction reference line L3 and the reference line L1 of the vehicle seat is θ1, and the angle that is formed by the vehicle longitudinal direction reference line L3 and the line L2 that runs along the direction of collision of the collision body with the vehicle is θ2. Then, the ECU 80 computes the collision angle θ by the following formula.

collision angle θ=angle θ2−angle θ1

Note that clockwise (toward the right) with respect to the vehicle longitudinal direction reference line L3 is positive, and counterclockwise (toward the left) with respect to the vehicle longitudinal reference line L3 is negative.

Due thereto, the passenger protecting device 10, 100, 200, 300 can be applied even to a vehicle in which a rotating-type vehicle seat is installed. As a result, even in a case in which the vehicle is involved in a collision in the midst of automatic driving for example, the inflated and expanded position of the multidirectional airbag 30 in the seat transverse direction can be shifted in accordance with the direction of the collision. Accordingly, even in a vehicle in which a rotating-type vehicle seat is installed, the head portion H of the seated person D can be restrained by the multidirectional airbag 30 at an early stage.

What is claimed is:

1. A passenger protecting device comprising:
an airbag device including an airbag that is structured as an integral bag body surrounding a head portion of a passenger and that, from a state of being accommodated in a headrest of a vehicle seat, receives a supply of gas from an inflator and is inflated and expanded, by a front expanding portion that includes a front inflating portion to be inflated and expanded at a seat front side of the head portion and at least one of a chest portion and shoulder portions of the passenger, and a pair of left and right lateral expanding portions that include lateral inflating portions that are connected to the front expanding portion and are inflated and expanded at sides of the head portion of the passenger;
a position changing device that, by operating, changes an inflated and expanded position of the airbag in a seat transverse direction, in accordance with a direction of collision of a collision body with respect to the vehicle seat; and
an electronic control unit configured to, on a basis of sensing or predicting collision of the collision body, cause the position changing device to operate before the inflation of the airbag and change the inflated and expanded position of the airbag,
wherein the airbag is accommodated in an airbag case, the airbag case includes a pair of left and right side walls that guide the inflation and expansion of the airbag, the airbag case includes a base portion that rotatably supports lower end portions of the side walls with a seat longitudinal direction being an axial direction,
wherein the position changing device includes a tilting mechanism portion that tilts the side walls in the seat transverse direction, the tilting mechanism portion is provided at an interior of an upper portion of the headrest,
wherein the tilting mechanism portion is structured to include:
a moving member that is connected to upper portions of the side walls and is structured so as to be able to move in the seat transverse direction, and
a driving member that, by driving, moves the moving member in the seat transverse direction.

2. The passenger protecting device of claim 1, wherein the vehicle seat is structured so as to be able to rotate with a seat vertical direction being an axial direction.

3. The passenger protecting device of claim 1, wherein the pair of left and right side walls are disposed at an interior of the headrest, and are structured by bodies that are separate from the base portion.

4. A passenger protecting device comprising:
an airbag device including an airbag that is structured as an integral bag body surrounding a head portion of a passenger and that, from a state of being accommodated in a headrest of a vehicle seat, receives a supply of gas from an inflator and is inflated and expanded, by a front expanding portion that includes a front inflating portion to be inflated and expanded at a seat front side of the head portion and at least one of a chest portion and shoulder portions of the passenger, and a pair of left and right lateral expanding portions that include lateral inflating portions that are connected to the front expanding portion and are inflated and expanded at sides of the head portion of the passenger; and a position changing device that, by operating, changes an inflated and expanded position of the airbag in a seat transverse direction, in accordance with a direction of collision of a collision body with respect to the vehicle seat, wherein the airbag is accommodated in an airbag case, the airbag case includes a pair of left and right side walls that guide the inflation and expansion of the airbag, the airbag case includes a base portion that rotatably supports lower end portions of the side walls with a seat longitudinal direction being an axial direction, wherein the position changing device includes a tilting mechanism portion that tilts the side walls in the seat transverse direction, the tilting mechanism portion is provided at an interior of an upper portion of the headrest, wherein the tilting mechanism portion is structured to include:
- a moving member that is connected to upper portions of the side walls and is structured so as to be able to move in the seat transverse direction, and
- a driving member that, by driving, moves the moving member in the seat transverse direction.

* * * * *